(12) United States Patent
Pfeifer et al.

(10) Patent No.: US 12,041,277 B2
(45) Date of Patent: Jul. 16, 2024

(54) METHODS AND SYSTEMS FOR ACCESSING STORED CONTENT

(71) Applicant: Comcast Cable Communications, LLC, Philadelphia, PA (US)

(72) Inventors: Jeremy Pfeifer, Highlands Ranch, CO (US); Christopher Lintz, Denver, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 18/155,168

(22) Filed: Jan. 17, 2023

(65) Prior Publication Data

US 2023/0179808 A1   Jun. 8, 2023

Related U.S. Application Data

(63) Continuation of application No. 16/996,608, filed on Aug. 18, 2020, now Pat. No. 11,570,487.

(51) Int. Cl.
| | |
|---|---|
| *H04N 21/2747* | (2011.01) |
| *G06F 12/0862* | (2016.01) |
| *G06F 16/176* | (2019.01) |
| *H04L 67/5681* | (2022.01) |
| *H04N 21/2187* | (2011.01) |

(Continued)

(52) U.S. Cl.
CPC ... *H04N 21/23106* (2013.01); *H04N 21/2187* (2013.01); *H04N 21/2387* (2013.01); *H04N 21/2393* (2013.01); *H04N 21/25891* (2013.01); *H04N 21/4331* (2013.01); *H04N 21/454* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 10,277,669 B1 * | 4/2019 | Joliveau | ............... H04L 67/568 |
| 10,382,812 B1 | 8/2019 | Mccarty et al. | |

(Continued)

FOREIGN PATENT DOCUMENTS

CN    111491175 A    8/2020

OTHER PUBLICATIONS

US Patent Application filed May 12, 2023, entitled "Methods and Systems for Storing User-Specific Media Sequences", U.S. Appl. No. 18/316,426.

(Continued)

*Primary Examiner* — Hsiungfei Peng
(74) *Attorney, Agent, or Firm* — BakerHostetler

(57) ABSTRACT

Methods and systems are described for storing content. One or more sections of the stored content may be subdivided into user-specific portions and common portions. The user-specific portions may be stored in user-specific storage associated with corresponding accounts of a plurality of user accounts. The common portions may be stored in common storage associated with the plurality of user accounts. User accounts may request access to the stored content. One or more caching criteria may be used to determine whether to cache any common portions of the stored content. Requests for the content may be processed using the common portions stored in the cache storage.

28 Claims, 11 Drawing Sheets

(51) Int. Cl.
    *H04N 21/231*     (2011.01)
    *H04N 21/2387*     (2011.01)
    *H04N 21/239*     (2011.01)
    *H04N 21/258*     (2011.01)
    *H04N 21/432*     (2011.01)
    *H04N 21/433*     (2011.01)
    *H04N 21/4335*     (2011.01)
    *H04N 21/454*     (2011.01)
    *H04N 21/845*     (2011.01)

(56) References Cited

U.S. PATENT DOCUMENTS

| | | | | |
|---|---|---|---|---|
| 11,336,928 | B1* | 5/2022 | Thornberry | H04N 21/23418 |
| 11,570,487 | B2* | 1/2023 | Pfeifer | H04N 21/4335 |
| 2002/0161911 | A1 | 10/2002 | Pinckney et al. | |
| 2004/0064416 | A1 | 4/2004 | Peled et al. | |
| 2006/0064757 | A1 | 3/2006 | Poslinski | |
| 2008/0178225 | A1 | 7/2008 | Jost | |
| 2009/0006796 | A1 | 1/2009 | Chang et al. | |
| 2009/0300673 | A1* | 12/2009 | Bachet | H04N 21/632 |
| | | | | 725/31 |
| 2012/0159558 | A1* | 6/2012 | Whyte | H04N 21/222 |
| | | | | 725/95 |
| 2014/0280688 | A1* | 9/2014 | Mao | H04L 67/5681 |
| | | | | 709/214 |
| 2016/0050468 | A1 | 2/2016 | Morten et al. | |
| 2016/0301958 | A1 | 10/2016 | Srinivasan | |
| 2017/0034543 | A1 | 2/2017 | Gerede et al. | |
| 2017/0199883 | A1 | 7/2017 | Terry et al. | |
| 2017/0353768 | A1 | 12/2017 | Muvavarirwa | |
| 2018/0270534 | A1 | 9/2018 | Badawiyeh | |

OTHER PUBLICATIONS

ISO Copyright Office, "ISO/IEC 14496-12 Information technology-Coding of audio-visual objects—Part 12: ISO base media file format", Oct. 1, 2005, pp. 1-94, Retrieved from the Internet: URL:https://1.web.umkc.edu/lizhu/teaching/2016sp.video-communication/ref/mp4.pdf.

Li Chunlin et al., "Adaptive Priority-Based Cache Replacement and Prediction-Based Cache Prefetching in Edge Computing Environment," Journal of Network and Computer Applications, Academic Press, New York, NY, US, vol. 165, May 2020, pp. 1-21.

US Patent Application filed Aug. 18, 2020, entitled "Methods and Systems for Accessing Stored Content", U.S. Appl. No. 16/996,608.

US Patent Application filed Dec. 19, 2019, entitled "Methods and Systems for Storing User-Specific Media Sequences", U.S. Appl. No. 16/721,600.

Venugopala et al.,"An approach for bitstream video watermarking on mobile device", 2016 International Conference on Signal Processing, Power and Embedded System (SCOPES), IEEE, Oct. 3, 2016, pp. 578-583.

* cited by examiner

METHODS AND SYSTEMS FOR ACCESSING STORED CONTENT

CROSS-REFERENCE TO RELATED APPLICATIONS

This application is a continuation application of U.S. patent application Ser. No. 16/996,608, filed Aug. 18, 2020, now U.S. Pat. No. 11,570,487, issued Jan. 31, 2023, which is hereby incorporated by reference in its entirety.

BACKGROUND

A variety of services are available that provide for personalized consumption of content. Users may desire to store content from a live channel for later consumption. However, content may be provided to different users in different container formats. The data may be required to be stored and accessed according to various security measures. Thus, there is a need for more sophisticated techniques for content storage and access.

SUMMARY

Disclosed herein are techniques for storing and accessing content. The disclosed techniques may configure a content system with greater efficiencies than conventional storing techniques. A content section may be subdivided in a user-specific portion and a common portion. Different versions and/or copies of the user-specific portion may be stored in corresponding user-specific storage for different user accounts. The common portion may be stored in common storage. The common storage may be independent from each of the user-specific storages. If playback of a content section is requested, then the user-specific portion associated with the requesting user account may be recombined with the corresponding common portion. The combined user-specific portion and common portion may be decoded to form the original playable content segment.

A user account may request access to the stored content (e.g., a content item). The user account may send a request for a content section of the stored content. A first portion may be determined to be stored in user-specific storage associated with the user account. A second portion may be determined to be stored in a cache storage or a common storage. The cache storage may store a range (e.g., a rolling window) of second portions. A range of content sections associated with a content source may be determined for caching based on one or more caching criteria. The one or more caching criteria may specify a threshold number of user accounts, a threshold distance between requested content sections of a content source, and/or the like. Second portions corresponding to the range of content sections may be moved and/or copied to the cache storage from the common storage. If a requested second portion is in the cache storage, the request may be processed using the cache storage. Otherwise the second portion may be accessed via the common storage. The second portion may be combined with the first portion to determine the requested content section. The combination of the first portion and the second portion may be combined with other data (e.g., header data). The combination of the first portion and the second portion may be sent to a user device associated with the user account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
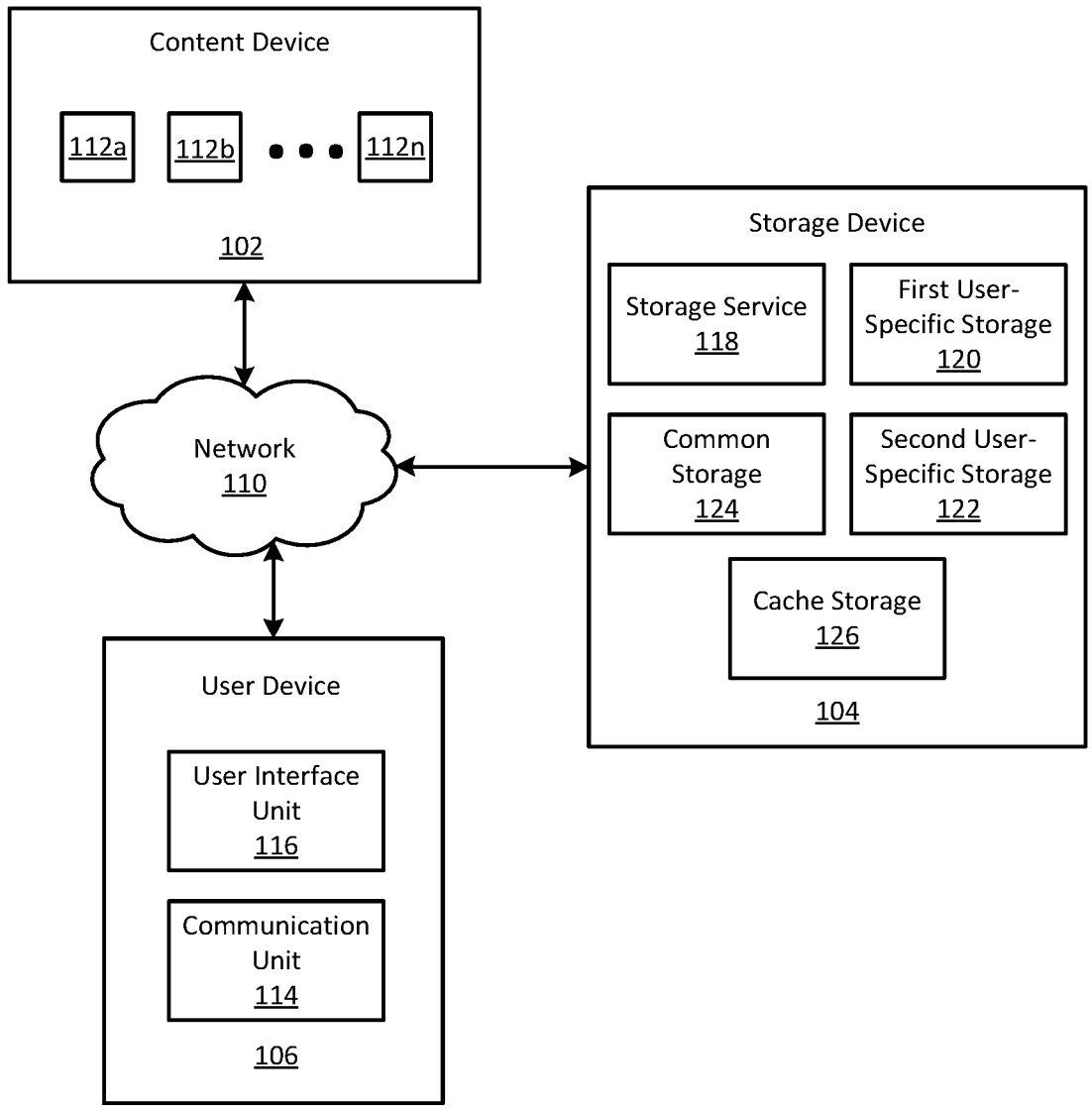
FIG. 1 is a block diagram showing an example operating environment.

Disclosed herein are techniques for storing and accessing content. The disclosed techniques may configure a content system with greater efficiencies than conventional storing techniques. A content section (e.g., a content segment) may be subdivided in a user-specific portion and a common portion. Different versions and/or copies of the user-specific portion may be stored in corresponding user-specific storage for different user accounts. The common portion may be stored in common storage. The common storage may be independent from (e.g., or separate from) each of the user-specific storages. A subsystem used for storing the common storage may be independent from (e.g., or separate from) a subsystem used for user-specific storage. The subsystem used for storing the common storage may be implemented using different storage than the storage used for storing the user-specific storages. If playback of a content section is requested, then the user-specific portion associated with the requesting user account may be recombined with the corresponding common portion. The combined user-specific portion and common portion may be decoded to form the original playable content segment.

In some scenarios, a content section of a content item may be recorded (e.g., or stored) while at the same time, another content section of the content item may be requested and/or sent for playback by a user device. This scenario, sometimes referred to as "hot playback" may be taxing on a content storage system, resulting in higher latencies and higher probability of failures. This may occur for popular live content, such as competitions, talent shows, sports, and/or the like. For popular shows, the number of unique recordings being written concurrently with unique segments being played back may reach numbers that are heavily taxing for the content storage system.

An example, non-limiting, scenario may comprise over ten thousand viewers that have associated processes of both recording and playback. If all content sections of the content are recorded uniquely per user without the ability to extract any commonality in the video, there may be massive inefficiencies in the system when those the user accounts are playing back the content within a relatively short time period to one another. If there existed a caching technique that cached common portions of the content sections, the ten thousand requests to a subsystem could be greatly reduced in both bytes and requests.

Disclosed is a new caching technique for common portions of the stored content. The disclosed caching technique may comprise tracking a number of requests for playback of a section of a content item. A range (e.g., window, logical window, sliding window, content window, rolling window) corresponding to a subset of the content sections of the content item may also be determined. The range may be based on a time system specific to the content item, such as a content stream time. The range may specify timing information (e.g., start time, end time, time range beginning, time range ending), section information, (e.g., first section, last section, section range beginning, section range ending), a combination thereof, and/or the like. Common portions that match the range of content sections may be copied and/or moved to a cache storage.

The range may be determined, created, updated, and/or the like based on a change in a metric indicative of requests for playback. The metric may comprise a number of requests for playback, a request rate associated with requests for playback, and/or the like. The request rate may comprise a number of requests occurring within a time interval.

By utilizing a range of time and/or a request rate of playback requests for the same content item (e.g., or same content source), a caching range may be implemented in which user accounts do not have to request the same content section to trigger caching of common portions for a range of content sections. Multiple playback requests for common portions within that range may be served from cache, rather than generating individual requests to the common storage subsystem for the same common portion as previous requests. If the number (e.g., or request rate, number within a time interval) of requests does not meet a threshold, caching may not occur at all (e.g., where only a handful of user accounts are playing back the same recorded program).

FIG. 1 is a block diagram showing an example system 100 for providing content. The system 100 may comprise one or more of a content device 102, a storage device 104, and a user device 106. The content device 102, the storage device 104, and the user device 106 may be communicatively coupled via a network 110.

The network 110 may comprise a content distribution and/or access network. The network 110 may facilitate communication via one or more communication protocols. The network 110 may comprise fiber, cable, a combination thereof. The network 110 may comprise wired links, wireless links, a combination thereof, and/or the like. The network 110 may comprise routers, switches, nodes, gateways, servers, modems, and/or the like.

The content device 102 may be configured to send content 112 to a plurality of users. The content 112 may comprise video data, audio data, closed caption (CC) data, a combination thereof, and/or the like. The content 112 may comprise a plurality of content channels (e.g., 112a, 112b, and up to 112n), such as live channels, streaming channels, cable channels, and/or the like. The content device 102 may comprise one or more servers. The content device 102 may be one or more edge devices of a content distribution network and/or content access network. The content device 102 may comprise a transcoder configured to encode, encrypt, compress, and/or the like the content. The content device 102 may comprise a packager configured to package the content, segment the content, and/or the like. The content device 102 may be configured to manage recorded content (e.g., schedule recordings, access recordings, etc). The content device 102 may send the content as a plurality of packets, such as transport stream packets, Moving Picture Experts Group (MPEG) transport stream packets, and/or the like. The content device 102 may send the content 112 to the storage device 104.

The user device 106 may be configured to receive the content 112 from one or more of the content device 102 or the storage device 104. The user device 106 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 106 may be configured to receive the content via a communication unit 114. The communication unit 114 may comprise a modem, network interface, and/or the like configured for communication via the network 110. The user device 106 may comprise a user interface unit 116. The user interface unit 116 may be configured to cause display of a user interface. The user interface may be configured to allow the user to browse available content, such as content sent by the content device 102, content stored by the storage device 104, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

The storage device 104 may be configured to store content, such as content recorded from a content channel, a content asset, and/or the like. The storage device 104 may store the content for a plurality of users. The storage device 104 may comprise a storage service 118 configured to store and/or manage storage of the content. The storage device 104 may be configured to send the stored content (e.g., after reconstituting the content) upon requests from the user device 106.

The storage service 118 may be configured to subdivide (e.g., deconstruct, divide) content into a plurality of portions for storage. Subdividing may include separating data into separate blocks, copying a single block as multiple separate blocks, and/or the like. The storage device 104 may receive the content from the content device 102. The content may be received as a plurality packets, such an internet protocol packets, transport stream packets, and/or the like. A packet may comprise one or more sections (e.g., segments, frames, blocks) of content. A section of content may comprise a plurality of frames of content. The storage service 118 may be configured to subdivide a section of content and/or a frame of content into the plurality of portions. The storage service 118 may be configured to subdivide each section of the content into a corresponding plurality of portions of the content. The storage service 118 may be configured to subdivide the content on a per user basis. The storage service 118 may be configured to subdivide the content such that the plurality of portions are different or the same for different users (e.g., for the same content).

The storage service 118 may be configured to subdivide content multiple times. The content may comprise header data and media (e.g., video, audio, bit stream) data. The content may be subdivided into a header portion comprising the header data and a media portion comprising the media data. The media portion may be subdivided into a first portion (e.g., a user-specific portion and a second portion (e.g., remaining portion, common portion).

The content (e.g., media portion, or section of the media portion) may comprise a bit sequence (e.g., an ordered sequence of bit values). The bit sequence may comprise encoded data, such as an entropy encoded data sequence, a context-adaptive binary arithmetic coding (CABAC) data sequence, a context-based adaptive variable-length coding (CAVLC) data sequence, and/or the like. The bit sequence may comprise encoded content separated from header data. The bit sequence may comprise one or more frames of the content.

The storage service 118 may determine the first portion and/or the second (e.g., for a specific section of content). The storage service 118 may determine the first portion and/or the second portion using a variety of techniques, such as the techniques shown in FIGS. 3A-D. The storage service 118 may determine the first portion and/or the second portion based on one or more selection rules, such as a predefined rule, a randomization function, and/or the like. The predefined rule may be any rule and/or function for determining the first portion and/or second portion.

The storage service 118 may determine the first portion based on a randomized selection of bits of the bit sequence. The randomized selection of bits may be bits matching a randomized data range (e.g., or other criteria, such a list of random numbers corresponding to an index of the bit sequence). The randomized data range may be generated using a randomization function (e.g., a random number generator, an algorithm or service that produces a random or pseudo-random number, for example, based on a seed). A random number may be generated and used to determine a number of digits or bits of the sequence that are within the range. If the random number is X, then the randomized data range may comprise the first X amount of bits of the bit sequence (e.g., for a frame), the last X amount of bits of the bit sequence, X number of bits beginning at an offset (e.g., randomized offset), and/or the like.

The randomization function may be applied (e.g., deterministically, to achieve the same result) for different users. The random number (e.g., or randomized data range) may be the same for each of a plurality of users (e.g., for a specific section of content). The randomization function may result in selection of different first portions and/or second portions for different sections of content.

For a first section of content, the first portion may be different than for a second portion of content. For purposes of illustration, the media data may comprise a first section of 100 bits and a second section of 100 bits. It should be understood that a typical bit sequence may be much longer (e.g., 160 bytes), but the example is used only for ease of explanation. If the storage service 118 determines a randomized data range of 10 bits for a first section, then the first portion associated with the first section may comprise the first 10 bits of the first section. The second portion may comprise the last 90 bits of the first section. If the storage service 118 determines a randomized data range of 15 bits for the second section, then the first portion associated with the second section may comprise the first 15 bits of the second section. The second portion may comprise the last 85 bits of the second section.

The first portion and/or section portion may be determined based on a constraint (e.g., parameter), such as a size, an amount, a ratio, a percentage, and/or the like associated with a section (e.g., or segment) of content. The constraint may indicate an amount of data (e.g., data bits, data blocks, data bytes) in the first portion, such as a minimum amount, maximum amount, range of the amount, and/or the like. The constraint may indicate an amount data (e.g., data bits, data blocks, data bytes) in the second portion, such as a minimum amount, maximum amount, range of the amount, and/or the like. The constraint may indicate an amount data from a section of content to include in the first portion and/or an amount data from the section to include in the second portion. The constraint may indicate that the first portion must be equal to or less than about 10%, about 5%, about 2%, about 1%, and/or the like of the section of content. The constraint may indicate that the second portion must be greater than or equal to about 90%, about 95%, about 98%, about 99%, and/or the like of the section of content. The constraint may indicate that the second portion and the first portion must be in a ratio of about 9 to about 1, about 8 to about 2, about 95 to about 5, about 98 to about 2, about 99 to about 1, and/or the like of the section of content. The constraint may be an average constraint, such that the first portion and second portion must be determined according to the constraint on average over multiple sections of content.

The constraint may be based on a characteristic of the content, such as size of the content, amount of motion in the content, type of frame in the content, a combination thereof, and/or the like. The constraint may be based on a size of a portion of content that a user device is expected to request. If the user device requests one segment (e.g., a 2 second segment comprising 48 frames) at a time, then the constraint may be based on a size of the segment.

The storage service 118 may store the first portions in user-specific storage. User-specific storage associated with a first user may comprise first user-specific storage 120 (e.g., a first location, first volume, first directory, first file, first grouping of files). User-specific storage associated with the second user may comprise second user-specific storage 122 (e.g., a second location, second volume, second directory, second file, second grouping of files). The first user-specific storage 120 may be different than the second user-specific storage 122. Permissions may be used to restrict users to access user-specific storage associated with the corresponding account. The first user-specific storage 120 may be associated with a first account. The second user-specific storage 122 may be associated with a second account. The first account may not have permission to access the second user-specific storage 122. The second account may not have permission to access the first user-specific storage 120.

The storage service 118 may be configured to store a copy of the first portion in the first user-specific storage 120. The storage service 118 may be configured to store another copy of the first portion in the second user-specific storage 122. The copy of the first portion stored in the first user-specific storage 120 may be identical to the copy of the first portion in the second user-specific storage 122. The storage service 118 may be configured to store a copy of the first portion from the first section and a copy of the first portion from the second section in first user-specific storage 120 and/or the second user-specific storage 122.

The storage service 118 may be configured to store the second portion (e.g., or second portions from each section) in common storage 124. A plurality of second portions (e.g., from different sections of content) may be stored as one file, or as separate files, or a combination thereof. The second portion may be stored with randomized data. Randomized data (e.g., one or more random bits or bytes) may be prepended, appended, inserted within, and/or the like the second portion. The second portion (e.g., for each section) may be stored only once for a plurality of users. A second portion (e.g., for a section of content) may be stored in the common storage for a first user account. The same copy of the second portion may also be used (e.g., referenced) for a second user account.

In some scenarios, the content (e.g., a content item) may have one or more versions of the content. Different versions of the one or more versions may be associated with (e.g., or sent to, stored for) different users. The one or more versions may correspond to different bit rates, encodings, device specific formatting, and/or the like. The one or more versions may comprise different watermarking data. The differences from one version of the content to another may be stored in user-specific storage. The common storage 124 may comprise portions of the one or more versions of the content that are the same. In addition or in the alternative, the common storage 124 may comprise a plurality of versions of the content. For a frame, different versions of the frame may be stored in the user-specific storage and/or the common storage 124. The one or more versions may comprise differences in slice, variations of an area within a picture, a combination thereof, and/or the like. A portion of content (e.g., a last frame of a set of frames, such as packet of frames) may be modified to generate the one or more versions of the content. Randomized bytes may be added to generate the one or more versions of content, versions of a set of frames, versions of a frame, and/or the like. Different users may access different version of the one or more versions to determine the content.

The storage service 118 may be configured to generate data for determining (e.g., reconstituting) the stored content. The data for determining the stored content may comprise an identifier of the first portion, a location of the first portion, an identifier of the second portion, a location of the second portion, an ordering of the first portion and second portion, and/or a combination thereof. The data for determining the stored content may comprise an association of the first portion and the second portion. The data for determining the stored content may be stored as a record in an index (e.g., or other data structure). If a section of content comprises K number of frames, the index may comprise K records. Each of the K records may comprise data for determining a corresponding frame of the section.

The data for determining the content (e.g., or frame) may comprise information for determining a portion of the content (e.g., the first portion) stored in user-specific storage, information for determining the portion of the frame stored in common storage, and/or the like. The data for determining the content may comprise data indicating X bits (e.g., or bytes) from the user-specific storage (e.g., corresponding to the first portion). The data for determining the content may comprise data indicating Y bits (e.g., or bytes) from the common storage 124 (e.g., corresponding to the second portion). The data for determining the content may comprise an association of the X bits and the Y bits (e.g., and instructions for recombining them). The data for determining the content may comprise a location, directory, file, bit offset, byte offset, and/or the like for locating the X bits and/or the Y bits.

The data for determining the content may be stored in the user-specific storage. The data for determining the content may be stored in an index file, a database, a document, a manifest, a data structure (e.g., XML, JSON, HTML), and/or the like. First data for determining the content may be stored in the first user-specific storage 120. Second data for determining the content may be stored in the second user-specific storage 122. If a request to access the content (e.g., or the frame) associated with the first user account is received, then the first data may be used to determine (e.g., reconstitute) the content. The first data may be accessed based on a user credential associated with the first user account. If a request to access the content (e.g., or the frame) associated with the second user account is received, then the second data may be used to determine the content. The first data may be accessed based on a user credential associated with the second user account.

The storage service 118 may be configured to process requests for the stored content. The storage service 118 may determine (e.g., reconstitute) sections of the content in response to requests for the corresponding sections. The storage service 118 may be configured to determine the content (e.g., or sections of content) based on the stored data for determining the content. The content (e.g., or section of content) may be determined by combining the first portion stored in user-specific storage (e.g., or common storage) and the second portion stored in the common storage 124. The X bytes from the user-specific storage may be combined with the Y bits from the common storage 124. The data structure for reconstituting the frame may be used to determine the specific data to recombine. The Y bits may be appended to the X bits (e.g., if the user-specific portion is from the beginning of the bit sequence).

The storage service 118 may be configured to locate the data for determining the content based on a user account (e.g., associated with a request for the content). The user account may be associated with a specific user-specific storage, user-specific storage area, and/or the like. A database may be used (e.g., by the storage service 118) to associate user accounts with corresponding user-specific storage. A database may be used (e.g., by the storage service 118) to associate user accounts with corresponding content recording information. The content recording information may comprise an identifier (e.g., or location) of user-specific storage, an identifier for data for determining the content, and/or the like. Upon receiving a request, the storage service 118 may determine (e.g., based on the association) the corresponding user-specific storage for a user account, the data for determining the content, and/or the like. The storage service 118 may access the user-specific storage (e.g., or other location, such as a database) to determine the data for determining the content. The data for determining the content may comprise an index, one or more entries in an index, and/or the like stored in the user-specific storage. The data for determining the content may comprise one or more entries in a database that may be determined based on a user account identifier, a content recording identifier, and/or the like.

The storage service 118 may use the data for determining the content to determine a location of a first portion of the content. The first portion of the content may be copied into memory. The storage service 118 may use the data for determining the content to determine a location of the second portion of the content. The second portion may be copied into memory and added to (e.g., appended to, combined with) the first portion to form a section (e.g., segment of content). The section of content may be sent to a user device 106 requesting the content. The request may be specific to the section of content. If the user device 106 requests a section (e.g., such as a 2 second segment of content) of content, the section of content may be determined and sent to the user device 106. The first portion and second portion may be combined as a media portion (e.g., CABAC encoded data). The media portion may be combined with a header portion (e.g., by appending the media portion to the end of the header portion). The combined header portion and media portion may be sent to the user device 106 (e.g., as a single section and/or segment of content). After receiving the requested section, the user device 106 may request (e.g., using a manifest) the next section of content. The process for determining the next section may then be performed. In some scenarios, multiple first portions and second portions (e.g., first portion $1_{1-n}$, second portion $1_{1-n}$, first portion 2, second portion 2) may be combined by the storage service 118. The multiple combined portions may be sent to satisfy a request for a section (e.g., segment) of content.

In some scenarios, the content may comprise watermarking data, such as an additional frame that is added to content, an additional set of data added to a bit sequence, and/or the like. The watermarking data may identify a user account that is accessing and/or requesting the content. The watermarking data may be stored in the user-specific portion. The data for determining the content may comprise data indicating the watermarking data.

The storage service 118 may be configured to implement a caching service, such as the caching service described elsewhere herein. The storage service 118 may be configured to cause storage (e.g., at least temporarily) of one or more second portions (e.g., or second portions from each section) in cache storage 126. Requests for second portions may be forwarded to the caching service. If a requested second portion is stored in cache storage 126, then the request may be processed using the second portion stored in the cache storage 126. If the second portion is determined to not be stored in cache storage 126, then the request can be processed by accessing the second portion stored in the common storage 124.

The one or more second portions may be caused to be stored in the cache storage 126 based on one or more caching criteria. The one or more caching criteria may be used to determine a range of content sections for caching in the cache storage 126. Content sections from the original content source (e.g., from which the content was recorded/stored) may be sequentially numbered (e.g., or otherwise identified). The numbering (e.g., or other identification) may be used to correlate stored (e.g., or recorded) content sections with corresponding (e.g., matching) content sections of the content source. If a content section from the original content source is used to determine a plurality of first portions and a corresponding second portion, the second portion can be associated with (e.g., based on the number or other identification) the content section of the original content source.

The range of content sections may be determined based on a threshold number of user accounts requesting to access content sections within a threshold period of time. The threshold number of user accounts can comprise any number, such as 5, 10, 100, 500, 1000, or any other number. The threshold period of time may comprise any time range, such as a 5 second time window, a 10 second time window, a 30 second time window, a 1 minute time window, or any other time window. Requests from user accounts can be tracked over time as one or more metrics. The one or more metrics may be analyzed and/or otherwise compared to the threshold number of user accounts, the threshold time period, and/or other caching criteria. If the one or more caching criteria are satisfied, then caching information may be determined. The caching information may comprise a range of content sections, a time to cache the range of content sections, an associated content source, and/or the like. The caching information may be used to cause second portions that match the caching information to be stored in the cache storage 126. The caching information may be updated over time (e.g., or the time to cache may expire) to cause the cached content to be updated and/or removed from the cache storage 126.

Figure 2:
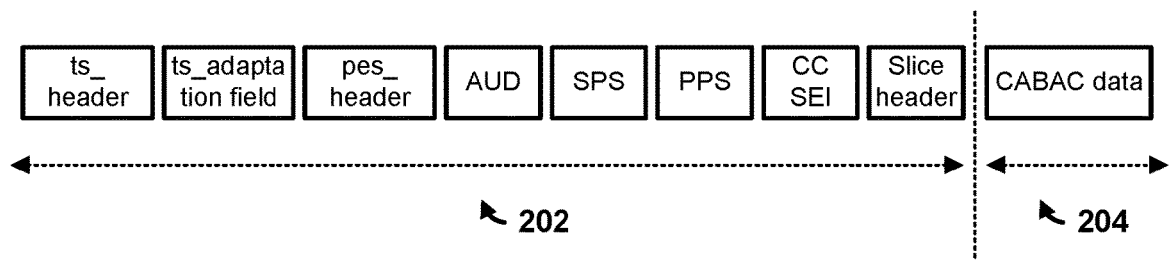
FIG. 2 is a diagram showing example content structure.

FIG. 2 is a block diagram showing example content. The content may comprise a media sequence, content sequence, bit sequence, and/or the like. The content may be divided into a plurality of portions, such as bit segments, byte segments, blocks (e.g., macroblocks), and/or the like. The content may comprise a plurality of packets, such as media transport stream packets. An example packet may comprise headers and adaptation field data.

The content may comprise a plurality of packets, such as transport stream packets, MPEG-2 transport stream packets, and/or the like. The content may be subdivided (e.g., divided, deconstructed, segmented) into one or more header portions 202 (e.g., a first bit sequence, a first file) and one or more media portions 204 (e.g., second bit sequence, a second file, non-header portion). A header portion 202 may comprise header data, adaption field data, and/or the like. A media portion 204 may comprise the data that remains after removing some or all of the headers. The media portion 204 may comprise media data. The media data may comprise one or more sections, segments, frames, blocks, and/or the like. The media data may be subdivided into one or more first portions (e.g., stored in user-specific storage) and one or more second portions (e.g., stored in common storage).

An example header portion 202 may comprise container/systems-specific data. The header portion 202 may comprise header data. The header portion 202 may comprise one or more headers for decoding the content. Several example headers are shown in FIG. 2 for purposes of illustration, but it should be understood that other headers may be used. For MPEG-2 TS, the header portion 202 may comprise systems metadata such as PAT, PMT, CAT, SCTE 35, EBIF, and/or the like. The header portion 202 may comprise one or more PES headers. For ISO-BMFF, the header portion 202 may comprise one or more (or all) ISO-BMFF boxes from the beginning of each fragment within the media file (e.g., start of 'ftyp' or 'styp' boxes) and till the end of the header of the 'mdat' box (e.g., till the first byte of the bitstream). For H.264 and H.265 video, the header portion 202 may comprise one or more (or all) non-VCL NAL units, one or more (or all) NAL headers of non-VCL NAL units, and/or the like. The header portion 202 may comprise slice headers of NAL units comprising slices.

The media portion 204 may comprise image data, video data, audio data, and/or the like. The media portion 204 may comprise bitstream data. The media portion 204 may comprise CABAC-coded data in case of H.264 and H.265. The media portion 204 may comprise a pixel-specific data, such as a pixel-specific sequence bitstream.

The process of deconstructing, subdividing, and/or the like of content described herein may be applied to non-NAL data, non-video media, audio data, and/or the like. For (E-)AC-3 the syncframe( ) and bsi( ) syntactic elements may be stored in the container-specific storage. The audblk( ), auxdata( ), and errorcheck( ) syntactic elements may be deconstructed into first portions (e.g., for user-specific storage) and second portions (e.g., for common storage).

As described in more detail elsewhere herein, the header portion 202 may be stored in user-specific storage and/or common storage. The header portion 202 may be stored in container-specific storage. The container specific storage may be stored in the user-specific storage, the common storage, a combination thereof, or a separate storage. The container-specific storage may be specific to a type of container associated with the content. Data, such as an index, may be stored for determining the content based on the header portion 202 and the media portion 204. One index may be stored for determining a media portion 204 based on first portions and second portions. Another index may be stored for determining a packet based on a header portion 202 and a media portion 204.

As shown in FIGS. 3A-D, the media portion 204 may be subdivided into a first portion 302 and a second portion 304 in a variety of ways. The first portions 302 and/or the second portions 304 may be stored in a single file (e.g., as a bit sequence) or multiple separate files. It should be understood that regardless of whether the first portions 302 are shown as separate or combined, the first portions 302 may be stored as a single file or as multiple files. It should be understood that regardless of whether the second portions 304 are shown as separate or combined, the first portions 302 may be stored as a single file or as multiple files. The first portions 302 may be stored as a single file on a per segment basis (e.g., or per section basis). The second portions 304 may be stored as a single file on a per segment basis (e.g., or per section basis). A segment (e.g., or section) may comprise a 2 second portion of content comprising, for example, 48 frames. Each segment may have an associated file (e.g., in user-specific storage) that stores the first portions 302. Each segment may have an associated file (e.g., in common storage) that stores the second portions 304.

Figure 3A:
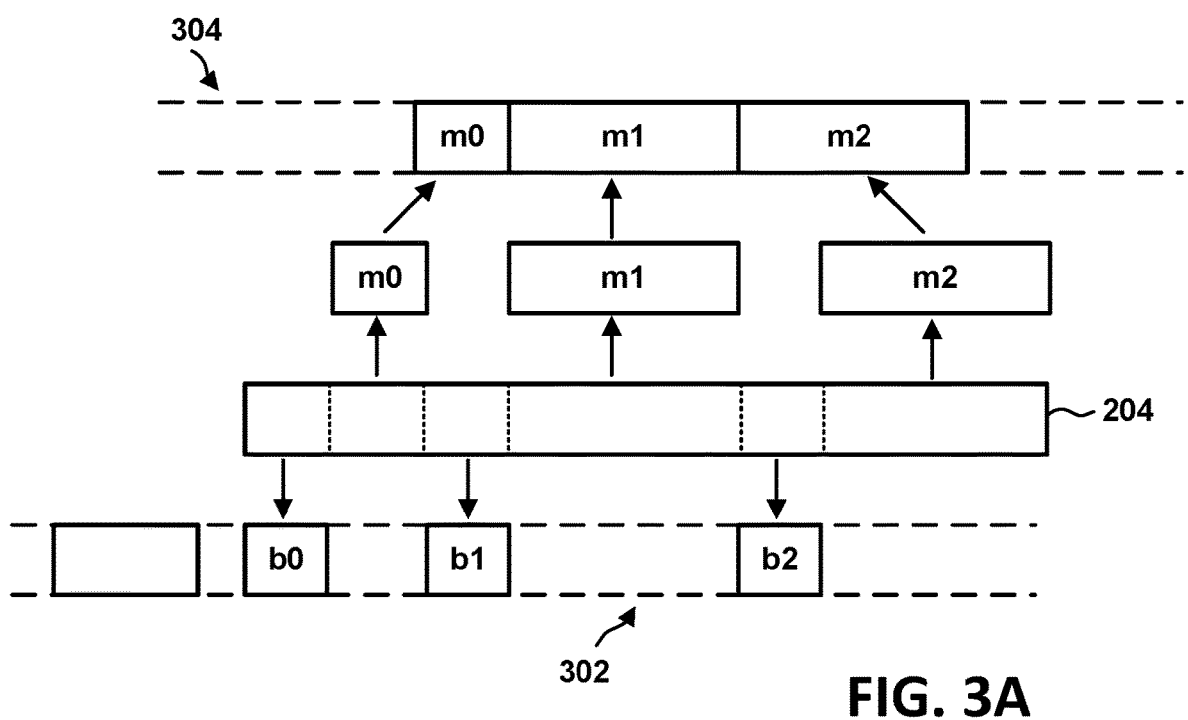
FIG. 3A is a diagram showing example content storage.

FIG. 3A shows an example storing of first portions 302 and second portions 304. The first portion 302 may be stored in user-specific storage. The second portion 304 may be stored in common storage associated with a plurality of user accounts. The first portion 302 may comprise a portion of a bit sequence. The first portion 302 may be determine based on one or more selection rules. The one or more selection rules may comprise any rule, function, logic, and/or algorithm for determining (e.g., selecting) portion of content (e.g., a portion of the bit sequence). The one or more selection rules may comprise a predefined rule for determining specific bits of the bit sequence. The one or more selection rules may comprise a randomization function that randomly selects content. The one or more selection rules may be applied deterministically, such that the same portions of content are selected for each user. The first portion 302 may be the same for different users storing the same content. A randomized sequence of bits may be determined using the randomization function to randomly select numbers in a sequence. After the randomized sequence of bits is determined, the randomized sequence of bits may be applied to each user in the same manner to determine the same user-specific portion for each user.

The one or more selection rules may vary in result for different portions of the content. The size (e.g., or number of bytes, bits) of the first portion 302 may be randomly determined for each of a plurality of sections of content (e.g., on a per segment, per macroblock, and/or per frame basis). A number of bits of the first portion may be based on a predefined number. A random number, R0, may be added to the predefined number to determine a randomized bit range. If the predefined number is X, the first at least X+R0 bytes of a data portion (e.g., of a frame, of the media portion 204) may be copied as a first portion 302. The first portion 302 (e.g., X+R0, which may be media data, such as CABAC coded data) may be copied into a file (e.g., as block b0 of a file as shown in FIG. 3A) in user-specific storage. The file may comprise other first portions (e.g., associated with the user) of the content. The file may comprise only the first portions of the content.

The selection rules (e.g., or randomization function) may comprise a randomization constraint. The randomization constraint may constrain selection of random information (e.g., random numbers, random byte ranges, randomized data added to the first portion and/or second portion). The random information may be constrained to match a probability distribution. A random number, R1, may be determined. R1 bytes of the content may be copied into the user-specific storage as block b1. Additional blocks of data may be copied into corresponding portions of the user-specific storage and the common storage until the content is completely stored (e.g., all frames of the content have been stored). The random numbers R0 and R1 (e.g., and other randomly determined information) may have an associated probability distribution. The probability distribution may be defined to tune the size and/or security of the blocks of data stored in the common portion. The random number may be determined based on the formula $R=N+r$ where $r$ is a Gaussian-distributed random number, and N is a constant.

Figure 3B:
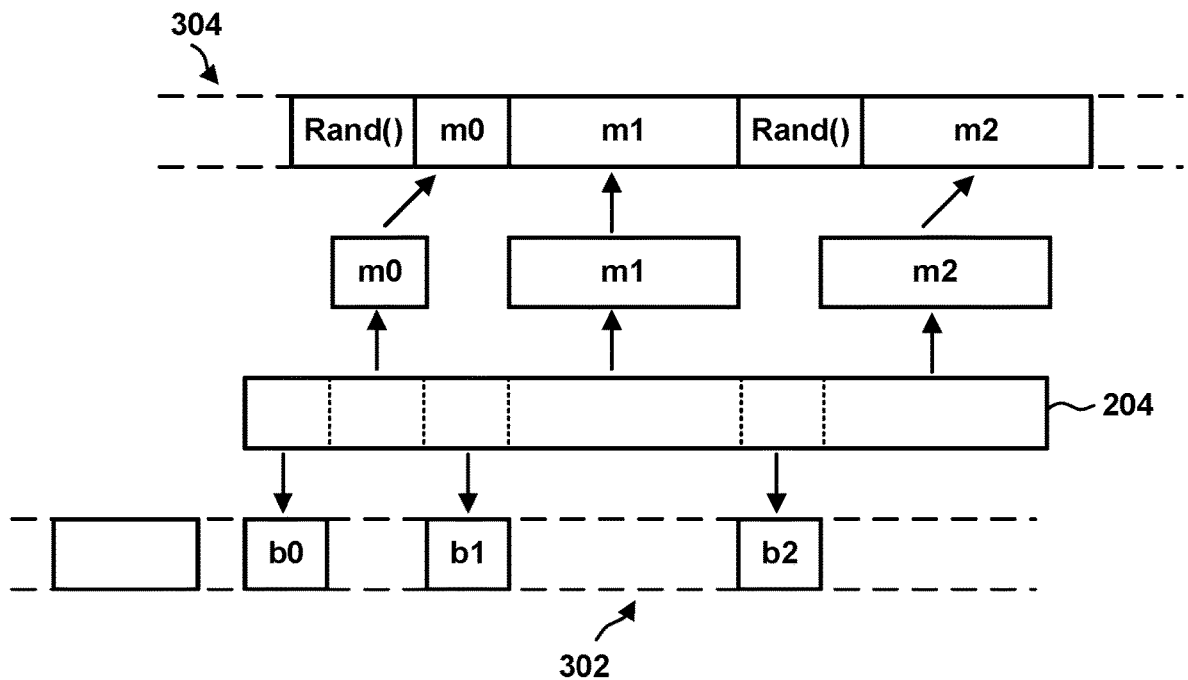
FIG. 3B is a diagram showing example content storage.

FIG. 3B shows another example storing of first portions 302 and second portions 304. The first portions 302 may be determined using the one or more selection rules (e.g., as in FIG. 3A). The first portions 302 may be stored in the user-specific storage. The second portions 304 may be stored in the common storage. Additional data may be added to the second portions 304 and/or common storage (e.g., to cause the stored data to be more difficult to decode). Random amounts of random bits (e.g., or bytes, shown as Rand( )) may be stored in the common storage (e.g., along with the second portions). The random bits may be stored in a sequence between one or more second portions 304, before a first one of the second portions 304, following a last one of the second portions 304, and/or a combination thereof. One or more of the data blocks (e.g., of the second portions 304) copied to the common storage may modified, encoded, and/or the like. A block may be further XOR'ed with a number. The number may be stored in the file in the common storage.

In some scenarios, the stored content may be the same or similar for different users. A first user and a second user may both request to store the same content (e.g., the same frame of content, same content asset). If content is being stored in common storage for the first user, the content can be compared to stored content (e.g., prior stored content) associated with the second user also stored in the common storage. A single content asset may have one file for storing the common portion for a plurality of different users. A signature associated with the content (e.g., or a part of the content such as a frame) may be compared to a signature of the content already stored for the second user. An example signature may comprise an MD5, SHA-1, SHA-3, and/or other signature. Signatures may be stored (e.g., in a database) for the header portion (e.g., header data, container-specific portion) and/or the common portion. The stored signature may be compared to a computed signature (e.g., computed based on the content associated with the first user). A signature associated with the header portion may be compared to one or more stored signatures. If an identical signature is not found, the content may be stored. In some scenarios, the content stored for different users may be the same. A header for one user may be the same as a header for another user. The content associated with the header may differ for different users according to formatting (e.g., container formatting), device content requirements, and/or the like.

The user-specific storage may comprise one or more files associated with the content. The user-specific storage may comprise metadata on the stored content (e.g., media sequence). The user-specific storage may comprise blocks containing user-specific bytes. The user-specific storage may comprise instructions for determining the content (e.g., a media sequence, section) from the combination of the first portion (e.g., container-specific portion) and the second portion (e.g., user-specific portion, the common portion).

If a user requests access to the content, the content may be determined (e.g., reconstructed) using the first portions 302 and the second portions 304. The instructions for determining the content may comprise an indication and/or location of a first portion 302. The instructions may comprise an indication and/or location of a second portion 304. The instructions may comprise an ordering of the first portion 302 and the second portion 304. The instructions may comprise one or more indications to skip the additional data. The instructions may comprise a first instruction (e.g., access X bytes starting at location B in a bit sequence) to access the first portion 302 in the user-specific storage, a second instruction (e.g., skip Y bytes starting at location R in a file in common storage) to skip the additional data stored in the common storage, a third instruction (e.g., access Z bytes starting at location M in a bit sequence) to access the second portion 304 in the common storage, and/or a combination thereof. The second instruction may be ordered (e.g., in an index) after the first instruction. The third instruction may be ordered after first instruction and the second instruction. The content, such a section (e.g., or segment, 2 second segment), may be reconstituted by following the first instruction, the second instruction, and/or the third instructions. In some implementations, the second instructions may be omitted (e.g., because accessing the location of the second portion 304 results in skipping the additional data). The content may be reconstituted by a server device and/or a user device.

Figure 3C:
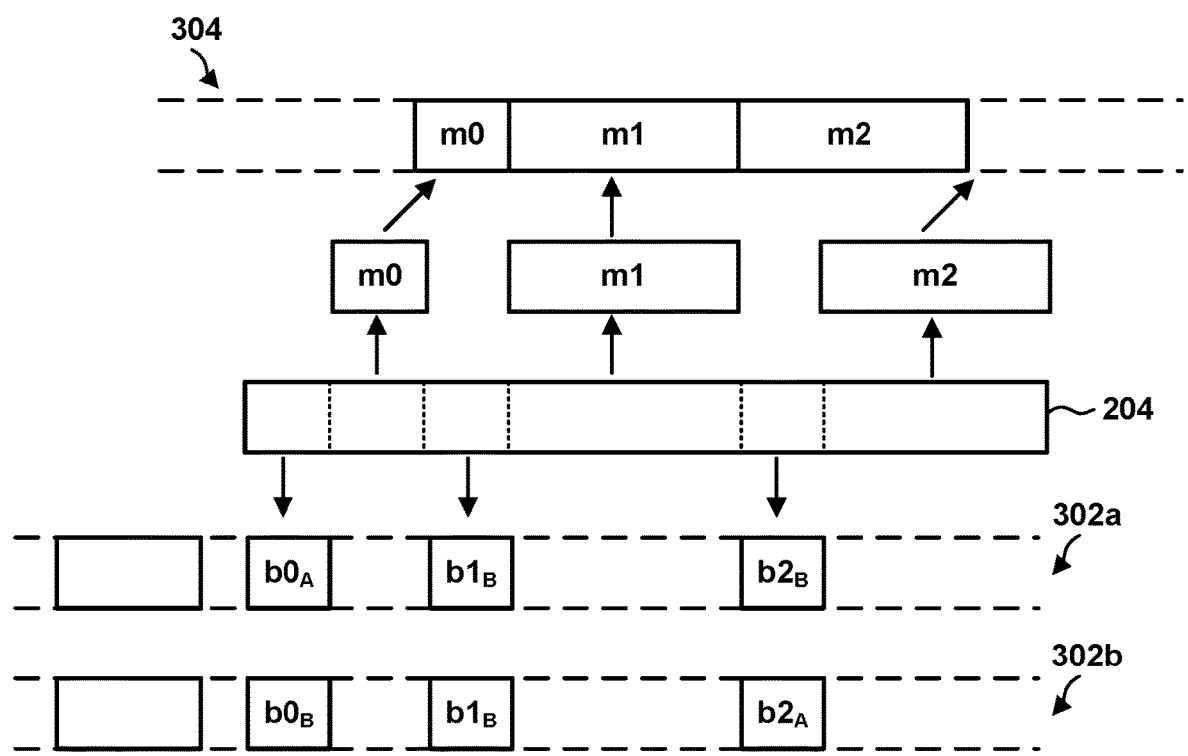
FIG. 3C is a diagram showing example content storage.

FIG. 3C shows another example of storing of first portions 302 and second portions 304. The content may be stored using watermarking or similar techniques. For a particular content item (e.g., content stream), the content item may be encoded as at least two versions of the content. The at least two versions of the content may be similar (e.g., or near identical) but may be different based on a difference in watermarking information. The watermarking information may comprise any type of information. The watermarking information may comprise, for example, data added to a frame. The watermarking information may be added to only one frame of a section (e.g., segment, 2 second segment of 48 frames). Though FIG. 3C only shows a single representation of the media portion 204 of the content, it should be understood that for different user accounts, the second portion may be different (e.g., based on the watermarking information).

The one or more selection rules may be used to determine which portions of the content are stored as user-specific content. The one or more selection rules may be applied (in a deterministic manner) such that the common portion is the same for different user accounts. The one or more selection rules may be applied (in a deterministic manner) such that the user-specific portions vary only based on the watermarking information.

As shown in FIG. 3C, the one or more selection rules may be used to determine a first portion 302a for user-specific storage associated with a first user account. The one or more selection rules may be used to determine a first portion 302b for user-specific storage associated with a second user account. The one or more selection rules may be used to determine the same common portion (e.g., m0, m1, m2) for both the first user account and the second user account.

The system may vary which of the at least two version of content are associated with (e.g., stored for) a user account. Which of the at least two versions of the content are received may vary on a section-by-section (e.g., segment-by-segment, frame-by-frame) basis. The version of the content for a section of content may be selected and/or determined randomly. As each section of content varies randomly for each user, a plurality of different copies of the content (e.g., which vary differently based on watermarking information, on a segment-by-segment basis) may be stored for a plurality of user accounts.

For a first section (e.g., or segment), a first user account may be associated with a first version of the content comprising first watermarking information (e.g., indicated with an "A" subscript in FIG. 3C). For a second section (e.g., or segment), the first user account may be associated with a second version of the content comprising second watermarking information (e.g., indicated with a "B" subscript in FIG. 3C). FIG. 3C shows a scenario in which the first user account the stores first portion b0 based on content version A, first portion b1 based on content version B, and first portion bn based on content version B. This scenario also shows that the second user account the stores first portion b0 based on content version B, first portion b1 based on content version B, and first portion bn based on content version A. It should be understood that this scenario is not limiting but is only one of many other scenarios which may result implementing the disclosed approach. Whether the first watermarking information or the second watermarking information is selected for a section may be determined randomly. By randomly selecting between the first watermarking information and the second watermarking information for each user may result in random and/or uniquely copies of content (e.g., different combinations of the first portions) stored in user-specific storage for different users.

Figure 3D:
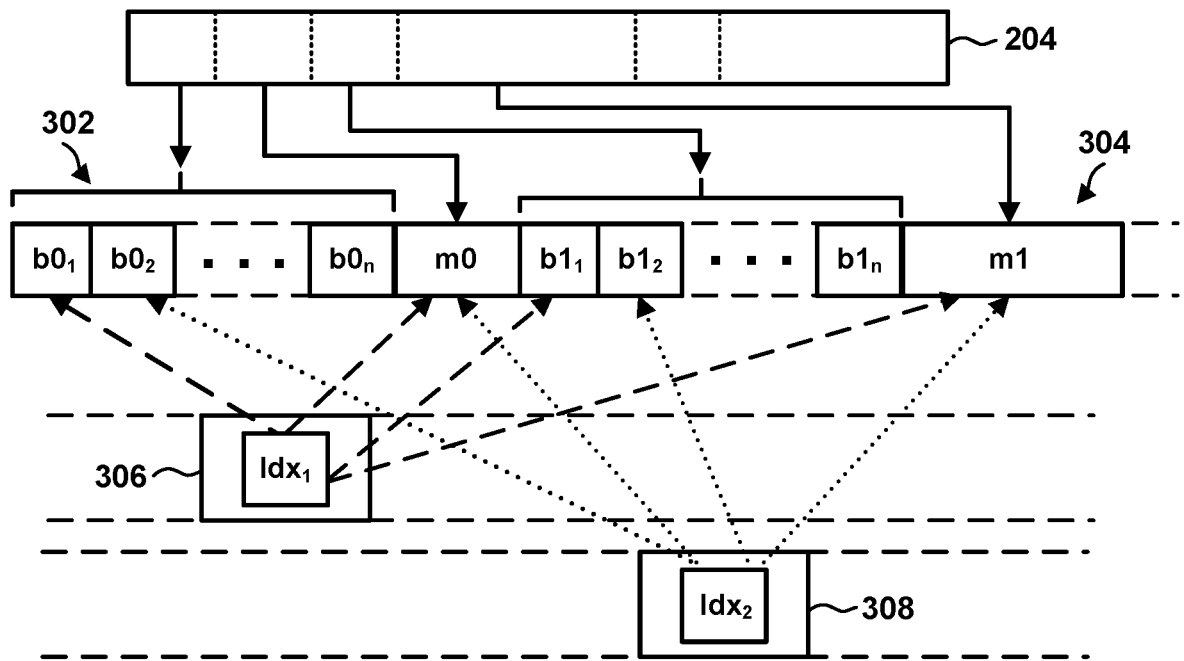
FIG. 3D is a diagram showing example content storage.

FIG. 3D shows another example of storing of first portions and second portions 304. The content (e.g., media portion 204) may be stored such that the user-specific storage may reference duplicated portions of content in the common storage. The content (e.g., media portion 204), may be subdivided into a first portion 302 and a second portion 304. The first portion 302 may be determined (e.g., using one or more selection rules). The second portion 304 may be a remaining portion that does not include the first portion 302. Both the first portion 302 and the second portion 304 may be stored in common storage (e.g., as bytes in a common file).

The first portion 302 may be stored redundantly in the common storage (e.g., as bytes in the common file). The redundant copies of the first portion 302 may be duplicated N times. N may be the number of users storing the content, a predetermined number, and/or the like. The redundant copies of the first portion 302 may be stored in the same file, bit sequence (e.g., sequentially in the bit sequence), and/or the like. The redundant copies of the first portion 302 may be separated by random amounts of random data.

An index file (e.g., $Idx_1$, $Idx_2$, $Idx_n$) may be stored in user-specific storage (e.g., of each user). The index file may be unique to each user (e.g., at least to a portion of users). The index file may reference a specific redundant copy (e.g., $b0_1$, $b0_2$, $b0_n$) of the user-specific portion stored in the common storage. The number of redundant copies of the user-specific portion stored in the common storage may be less than a number of a plurality of user accounts associated with storing the content. The index file may reference the common portion (m0). The dashed lines with arrows in FIG. 3D indicate that an index file references (e.g., includes a location to access) the first portion 302 and the second portion 304. As shown in FIG. 3D, a first user may have an associated first user-specific storage 306 comprising a first index file. A second user may have an associated second user-specific storage 308 comprising a second index file. A third user may have an associated third user-specific storage (e.g., not shown) comprising a third index file. The first user, second user, and third user may each be associated with different (e.g., unique) copies of the content. The user-specific portion for each of the copies of the content may be different and/or unique. The data stored in the first user-specific storage 306 may be different from the data stored in other user-specific storages (e.g., based on the index files referring to different first portions).

An index file may comprise an instruction to skip one or more of the redundant copies of the first portion 302 stored in the common storage. The index file may comprise an instruction to skip random bytes in the common storage. The index file may comprise an instruction to skip redundant copies of first portion 302, access the copy of the first portion associated with the user, and/or access the common portion associated with the user.

An example data file (e.g., video stream data, bit stream data, video data, audio data) can be stored for a plurality of users. The data file can comprise a CABAC-coded file. For purposes of illustration, the data file can comprise 100 bytes, but it should be understood that any file size can be used. N may be selected as 20 bytes, starting at byte O. M would then be selected as the remaining 80 bytes (e.g., 100–20). The first 20 bytes may be copied in to a file in the common storage 42 times (e.g., or any other number). Following these 42 copies, the remaining 80 bytes may be stored in the file. The file may comprise 920 bytes.

For user accounts u=0 . . . 41, a byte range may be calculated as [u*20, (u+1)*20)], which is the u-th 20-byte range. This byte range (e.g., as $b0_{1-n}$, $b1_{1-n}$) or data indicative of this byte range (e.g., if stored in common storage) may be copied into common storage. Data indicating the location of a corresponding byte range may be stored in the user-specific storage for a corresponding user account. Remaining portions of the content not included in the byte range may be stored in the common portion (e.g., along with copies of the byte range). For user account 0, the byte range may comprise [0,20]. In user-specific storage associated with user account 0, a record may be stored indicating an instruction to access the [0,20] byte range from common storage. For user account 1, the byte range may comprise [20, 40]. In user-specific storage associated with user account 1, a record may be stored indicating an instruction to access the [20,40] byte range from common storage.

The records may be stored in corresponding indexes associated with the first user account and/or the second user account. An index may comprise a "skip" instruction for the first u*20 bytes, a "copy from user-specific storage" instruction for 20 bytes, a "skip" instruction for (42−u+1)*20 bytes, a "copy from the common portion" instruction for last 80 bytes, or a combination thereof. These instructions may be used to determine (e.g., or reconstitute) the content by combining the corresponding first portions (e.g., b0, b1, b2) and second portions (e.g., m0, m1, m2, etc.) for a plurality of sections of the content. It should be understood that different users may have different index files that copy, access, and/or skip different portions of the redundant copies of the user-specific portion.

It should be appreciated that the one or more of the aspects shown in FIGS. 3A-D may be combined. For example, an aspect shown in FIG. 3B may be combined with any one of the aspects of FIGS. 3A, 3C, and/or 3D. An aspect shown in FIG. 3C may be combined with any one of the aspects of FIGS. 3A, 3B, and/or 3D. An aspect shown in FIG. 3D may be combined with any one of the aspects of FIGS. 3A, 3B, and/or 3C. The watermarking techniques associated with FIG. 3C may be used in combination with the randomized additional data techniques associated with FIG. 3B.

Figure 4:
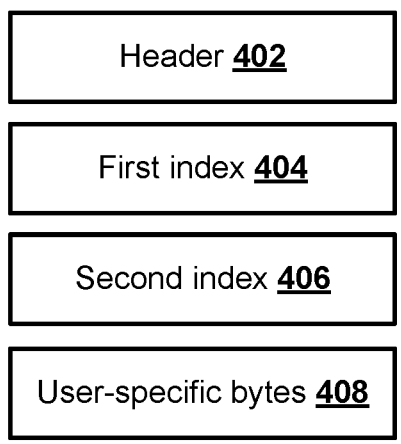
FIG. 4 is a diagram showing example content storage.

FIG. 4 shows an example implementation of a user-specific storage format. The user-specific storage format may be used to store user-specific data as one or more files. The user-specific data may be associated with a specific content recording, content asset, content channel, a user associated with the recording, a combination thereof and/or the like. The user-specific data may comprise a header 402, a first index 404, a second index 406, user-specific bytes 408 (e.g., user-specific portion of the content), a combination thereof, and/or the like.

The header 402 may comprise data (e.g., metadata) indicating the syntax of one more indices, such as the first index 404 and the second index 406. The syntax data indicating the syntax may comprise one or more field identifiers, field lengths, hash and encryption algorithms, hashes data (e.g., hashes of the contain-specific portion, hashes of the common portion), encryption keys, key identifiers, initialization vector (IV), additional authenticated data (AAD), a combination thereof, and/or the like.

The first index 404 may be associated with and/or comprise data related to one or more media portions of the content, such as first portions stored in user-specific storage and second portions stored in common storage. The first index 404 may comprise a plurality of entries (e.g., or records). An entry may comprise one or more fields, such as a number of bytes to copy from the user-specific bytes 408, number of bytes to copy from the common storage (e.g., bytes from a corresponding common file in the common storage), a number of times an operation indicate in the entry should be repeated, a combination thereof, and/or the like. The one or more fields may be used to indicate bytes in a file of the common storage to skip, a modification of the blocks in the common storage (e.g., application of XOR to mantle blocks), and/or the like.

The second index 406 may be associated with and/or comprise data related to one or more header data of the content (e.g., first portion, container-specific portion, the header portion 202 of FIG. 2). The second index 406 may comprise a plurality of entries (e.g., or records). An entry may comprise one or more fields, such as a number of bytes to copy from the reconstructed content (e.g., the bitstream file reconstructed using the user-specific portion and the common portion), a number of bytes to copy from the header data of the content, a combination thereof, and/or the like.

The user-specific bytes 408 may comprise user-specific portions (e.g., first portions) copied from the content (e.g., bitstream) by the deconstruction process illustrated in FIGS. 3A-D. The user-specific bytes 408 may be encrypted. If the user-specific bytes 408 are encrypted, key information for decrypting the user-specific bytes may be stored in the header 402.

Figure 5:
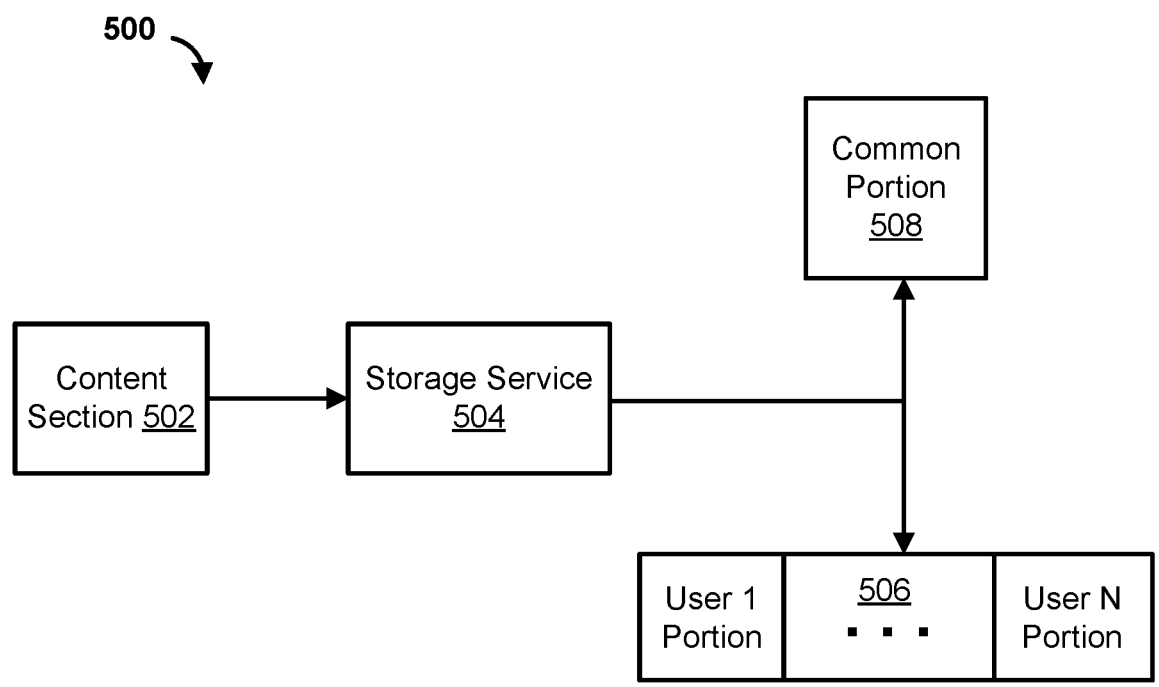
FIG. 5 is a diagram showing example content storage.

FIG. 5 shows an example system 500. The system 500 may be at least a part of the storage device 104 of FIG. 1

(e.g., or be one or more nodes, devices, or services implementing features of the storage device 104). The system may be configured for storage of content items, such as content items recorded from one or more of a plurality content streams. The system 500 may determine a content section 502 of a content item. The content section 502 may be determined based on receiving the content section 502 as part of a content stream of the plurality of content sections. The content section 502 may be determined (e.g., or received) by a storage service 504 (e.g., or compression service).

The storage service 504 may be configured to determine, based on the content section 502, a plurality of user-specific portions 506. The plurality of user-specific portions 506 may each be a separate copy of a determined user-specific portion. The separate copies may be identical copies, or may be varied according to the techniques described herein. The storage service 504 may be configured to determine, based on the content section 502, a common portion 508. The storage service 504 may subdivide the content section 502 into the common portion and the plurality of user-specific portions 506. The system 500 may be configured store only one copy of the common portion 508 for each section of a content item. The system 500 may be configured to store many copies of the corresponding user-specific portions, for each section of the content item.

If a playback request for a section is received, one of the plurality of user-specific portions 506 and the common portion 508 may be recombined to create a playable section of the content item. This approach may result in the same common portion being read from a storage subsystem repeatedly if multiple users are accessing the stored content based of the same original source stream, which may be highly inefficient. One approach to solve this problem is to cache all the common portions, but there are major problems with this approach. Cache memory is finite, and the amount of stored content is far larger than what is available in cache. This approach may also waste memory to cache something that no other user will use before it expires from cache. Disclosed herein are methods and systems for more efficiently accessing and storing content.

Figure 6:
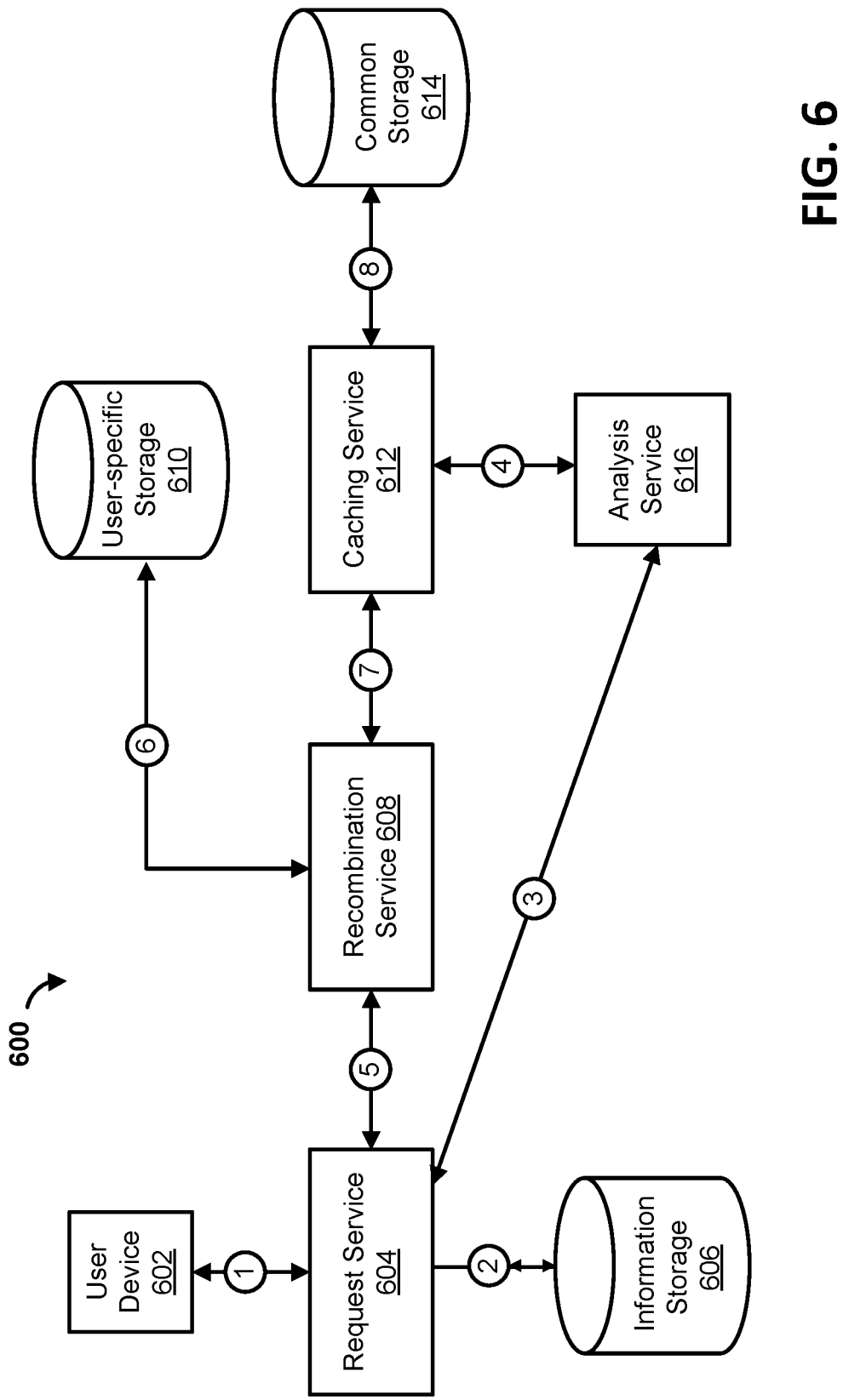
FIG. 6 is a diagram showing example content access.

FIG. 6 shows an example system 600. The system 600 may be configured to facilitate playback of stored (e.g., recorded content), such as content stored using the system of FIG. 1 and/or FIG. 5 (e.g., using any processing disclosed herein). The system 600 may comprise a user device 602. The user device 602 may comprise any user device, such as a computing device, smart device (e.g., smart glasses, smart watch, smart phone), a mobile device, a tablet, a computing station, a laptop, a digital streaming device, a set-top box, a streaming stick, a television, and/or the like. The user device 602 may be associated with a user account. The user device 602 may be associated with the user account based on authentication of the user device using credentials associated with the user account.

The user device 602 may be configured to access a content storage service. The content storage service may be facilitated by one more services, such as a request service 604, an information storage 606 (e.g., or information storage service), a recombination service 608, a user-specific storage 610, a caching service 612, a common storage 614, an analysis service 616, or a combination thereof. The one or more services may be implemented by one or more computing nodes, virtual machines, computing devices, or a combination thereof.

For purposes of illustration, and without limiting the scope of the disclosure, the following example scenario is provided. Consider the case where two users are recording ESPN, and a third user is recording ABC. Each recording may be assigned a random identifier, and records the section (e.g., segment) from the source stream when the recording start. An example table for such a scenario is shown in Table 1.

TABLE 1

| User Recording ID | Source Stream ID | Source Section Number |
|---|---|---|
| F69602D2 | ESPN | 152 |
| 4BBF923B | ESPN | 250 |
| 8280DD37 | ABC | 647 |

For simplicity, assume that a content recording starts at segment 0, but a different number may be used. In this case, recording 4BBF923B started recording ESPN 98 segments after recording R69602D2 started recording the same stream.

At step 1, the user device 602 may send a request to the request service 604 (e.g., or to the content storage service). The request may comprise a request to access and/or playback a section of a content item. The user device 602 may receive (e.g., from the content storage service) an index (e.g., or manifest) comprising a list of content sections (e.g., or segments) associated with the stored content item. The index can be accessed from user-specific storage associated with the user account. The index may be specific to the recording and/or stored content. The list of content sections may comprise an identifier, number, content section number, uniform resource identifier, and/or the like for specifically requesting each corresponding section. The request may comprise a hypertext transfer protocol request. The request may be of the form "GET/rec-[recording identifier]/seg-[section identifier].ts". For example, if the recording identifier is F69602D2, and the first user requests the section with identifier of "3", the request may comprise "GET/rec-F69602D2/seg-3.ts"

At step 2, the request service 604 may process the request by sending a query to the information storage 606. The information storage 606 may comprise information about a plurality of stored and/or recorded content items. The information may comprise source information, source section information, content item information, stream information, and/or the like. The system 600 may be configured to track (e.g., number, count) content sections associated with a content source. A content source may comprise a content channel, such as ESPN or ABC. A content stream from the content source may have a plurality of different content items, sequentially sent via the stream. The information may comprise an indication of content sections from a content source that correspond to a stored content item. The request service 604 may determine, based on one or more queries to the information storage 606, that the requested stored content section is associated with a content source, a source content section, and/or the like. A recording identifier may be associated with a beginning source section identifier, an ending source section identifier, a source section range, and/or the like.

The request service 604 may query the information storage 606 to determine a source stream, a start segment of the source stream, a combination thereof, and/or the like. The request service 604 may send a request comprising a recording identifier. The information storage 606 may return a source identifier (e.g., channel name), a source section identifier, and/or the like. If the query comprises the F69602D2, the response to the query may comprise a source identifier of ESPN and a source section identifier of 155. The query may also comprise the section identifier (e.g., 3). The source section identifier returned by the query may comprise the source section identifier that corresponds to the section identifier. If a beginning section identifier is returned, the request service 604 may determine the source section that corresponds to the section identifier by incrementing the source identifier by the requested section identifier. For example, the source section identifier 152 may be incremented by 3 to determine a source section identifier of 155.

At step 3, the request service 604 may send the information from the information storage 606 to an analysis service 616. The information may comprise the source identifier, a source section identifier corresponding to the requested stored content section identifier, and/or the like.

The analysis service 616 may be configured to store information received from the request service 604 associated with a plurality of requests. Each time a user device, such as user device 602 requests a content section (e.g., or segment), the analysis service 616 may receive a message indicating the corresponding source identifier and source section identifier. The analysis service 616 may analyze the stored information to determine one or more metrics. The one or more metrics may comprise a count associated with a source content section. The count may be indicative of a number of user accounts requesting stored content sections that correspond to the same source content section (e.g., or source content section identifier). The one or more metrics may comprise a request rate for the content.

The analysis service 616 may be configured to analyze the one or more metrics based on one or more caching criteria. The one or more caching criteria may comprise conditions, thresholds, and/or the like for triggering caching of content. The analysis service 616 may be configured to determine, based on the analysis, caching information. The caching information may comprise one or more ranges (e.g., or windows) of content sections. The one or more ranges may comprise a range of source content sections, source content section identifiers, and/or the like. The one or more ranges may comprise a starting source content section identifier, an ending source content section identifier, a number of sections in the range, and/or the like.

At step 4, the analysis service 616 may send the caching information to the caching service 612. The caching information sent to the caching service may comprise the one or more ranges of content sections, the source identifier, a number of content sections in the range, timing information (e.g., number of seconds to retain range in cache storage), and/or the like. A threshold number of requests may be received within a threshold time. If the requests within the threshold time are requests for content sections within a threshold range of content sections (e.g., having a difference between the lowest and highest segment be less than a threshold), then a determination may be made to cache a corresponding range of content segments (e.g., or sliding window). The corresponding range may be determined (e.g., calculated) based on one or more of the threshold range, a predicted range, a default range, and/or the like. The predicted range may be determined based on determining the range of requested content segments (e.g., from a lowest to highest). The range of requested content segments may be shifted by adding a number to the range (e.g., by adding the number to the lowest to get a new low end and/or to the highest to get a new high end).

If a threshold number of requests (e.g., three, for purposes of illustration) for content segments are within a threshold range of content segments of each other (e.g., fifteen), a sliding window may be determined. If requests are received for segment X, X+10, and X−4, (as a simple non-limiting example) a determination may be made that a threshold number of requests are received within the threshold range (e.g., fifteen) and threshold time (e.g., thirty seconds). A range of content sections and/or sliding window may be determined as the caching information.

The analysis service 616 may determine that a threshold number of users are requesting content sections that correspond to the source content range of [155-185] for ESPN. The caching information sent may comprise an identifier indicative of ESPN, the source content section range of [155-185], an indication to store the range in cache storage for 30 seconds, and/or the like. The caching service 612 may receive the caching information. The caching service 612 may retrieve one or more second portions (e.g., one or more common portions) from the common storage based on the caching information. The caching service 612 may retrieve the one or more second portions that correspond to the content sections in the source content range.

At step 5, the request service 604 may be configured to forward the request from the user device 602 to the recombination service 608. The request may be sent with the information from the information storage 606. The information from the information storage 606 may be sent as metadata associated with the request. The information may be added to (e.g., stored in) one or more header fields of the request. If the request is an HTTP request, the one or more header fields may comprise HTTP header fields. The one or more header fields may comprise a source field. The source field may store a source identifier (e.g., identifier indicating a content channel). The one or more header fields may comprise a source segment field. The source segment field may comprise a segment identifier indicating the segment that is requested. The information may comprise the source identifier, the source content section identifier, and/or the like. The request may comprise ""GET/rec-F69602D2/seg-3.ts" and include a source header "Source: ESPN" and a source section header "SourceSeg: 155".

At step 6, the recombination service 608 may access a first portion (e.g., a user-specific portion) of a stored content section from the user-specific storage 610. The first portion may be accessed and/or determined based on the request. The first portion may be accessed and/or determined based on the recording identifier and the section identifier. The user-specific storage 610 may be searchable based on recording identifier and second identifier. The first portion may correspond to a portion of the original source content section. The first portion may be a copy of a portion of an original source content section received from the content source. The first portion may comprise additional information and/or comprise a version of the portion of the original source content section. The copy of the first portion may be stored (e.g., temporarily) in storage associated with the recombination service 608.

At step 7, the recombination service 608 may send a request to the caching service 612 for a second portion (e.g., a common portion). The request may comprise the source identifier and/or the source section identifier. The recombination service 608 may replace the recording identifier with the corresponding source identifier in generating the request. The recombination service 608 may replace the section identifier with the corresponding source section identifier in generating the request. The request may comprise an HTTP request with a uniform resource identifier comprising the source identifier and/or the source section identifier. The request may be of the form "GET/stream-[source identifier]/seg-[source section identifier].ts". An example request may comprise "GET/stream-ESPN/seg-155.ts". In some scenarios, other HTTP commands may be used instead of GET, such as POST.

The caching service 612 may receive the request from the recombination service 608. The caching service 612 may determine if a second portion associated with the requested content section is stored in cache storage. If the second portion (e.g., or copy of the second portion) is stored in the cache storage, the caching service 612 may send the second portion to the recombination service 608. If the second portion is not stored in the cache storage, the caching service 612 determine to retrieve the second portion from the common storage 614. If the second portion matches caching information received from the analysis service 616, the second portion (e.g., or a copy of the second portion) may be stored in the cache storage according to any criteria, such as timing information, in the caching information.

At step 8, the caching service 612 may send a request to the common storage 614 for the second portion. The request sent to the common storage 614 may comprise the request received by the caching service 612. The request may comprise the source identifier and/or the source content section identifier. An example request may comprise "GET/stream-ESPN/seg-155.ts". In some scenarios, other HTTP commands may be used instead of GET, such as POST. The common storage 614 may determine the second portion associated with the requested content section. The source identifier, and/or source content section identifier may be associated with the second portion (e.g., and be used to access finding/accessing the second portion) in the common storage 614.

The second portion determined from the cache storage or the common storage 614 may be sent to the recombination service 608. The recombination service 608 may be configured to determine a combination of the first portion from the user-specific storage 610 and the second portion from the cache storage or the common storage 614. Determining the combination of the first portion and the second portion may comprise appending the second portion to first portion.

Figure 7:
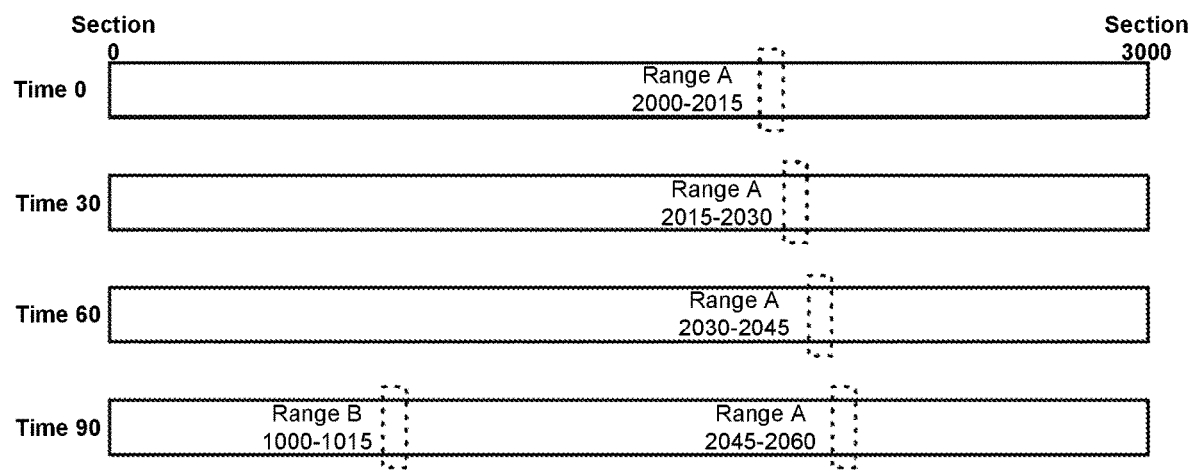
FIG. 7 is a diagram showing example content access.

FIG. 7 shows a diagram of example ranges for caching content sections. As shown, the range of content sections indicated in the caching information may be modified over time. One or more ranges of content sections indicated in the caching information may be implemented as a sliding window, rolling window, and/or the like. The one or more ranges may be adjusted over time to account for anticipated and/or predicted requests for stored content sections. In some scenarios, multiple different ranges of content sections may be implemented for caching on the same source stream. For example, different groups of user accounts may be requesting different sections of the same content item at different times.

As a non-limiting illustration, consider the scenario where a large number of user accounts request recording of a sporting event as a scheduled recording (e.g., all starting at the same source stream section number). A few minutes after the recording starts, 1000 user accounts may start may request access to the new started recordings. The analysis service 616 may send, to the caching service 612, the following tuple: ESPN, [2000-2015], 30. Note that the use of closed brackets indicates that the beginning and ending numbers indicated are included in the range. All of the 1000 user accounts are not likely to request the same content section at the same time, but the user accounts may be accessing a content section in a range (e.g., or window). The range (e.g., or window) may be updated as user accounts access the requested content sections. As a non-limiting illustration, an initial range may comprise content sections [2000-2015]. After 30 seconds, the content section range may be updated to a new range of content sections [2015-2030]. An example pattern is shown in Table 2.

TABLE 2

| Time | Section Range | Number of Users |
| --- | --- | --- |
| 0 | A: 2000-2015 | 1000 |
| 30 | A: 2015-2030 | 1000 |
| 60 | A: 2030-2045 | 1000 |
| 90 | A: 2045-2060 | 1000 |
|  | B: 1000-1015 | 350 |

After 90 seconds of playback, another group of 350 user accounts may start requesting content recordings based off the same source stream but from an earlier point in time. The analysis service 616 may determine an additional range of content sections based on the group of 350 users. The caching service 612 may be sent instructions to begin storing two different ranges (e.g., or 2 rolling windows) of content sections for recordings associated with the same source stream. The first range, range A, may be the content section range [2045-2060] that is associated with the initial 1000 user accounts. The second range, range B may be the content section range [1000-1015] that is associated with the 350 user accounts. The analysis service 616 may adjust one or more of the size of the range or the timing information (e.g., TTL, time to keep range active) sent to the caching service 612. The adjustments may be based on the number of user accounts accessing a specific source stream (e.g., or accessing stored content associated with the same content item and/or source stream), the location within the range of the user accounts, a combination thereof, and/or the like.

As a non-limiting illustration, consider range B in Table 2 that has 350 user accounts associated with the range. If the number of user accounts drops below a threshold (e.g., 10 users), the range may be eliminated. Elimination of the range may result in the remaining 10 active playbacks causing the second portions to be accessed from the common storage 614 instead of the cache storage.

As a non-limiting illustration, another use case may occur if a large number of user accounts request content sections at a location between range A and range B. The analysis service 616 may generate a new range in response to the increase of requests. The new range may comprise a third range. The new range may comprise expansion of one of the other ranges (e.g., range A or range B) if the potential new range is within a threshold number of sections of a pre-existing range (e.g., or if the ranges overlap). If a threshold number of user accounts requested content sections in the range [1980-1995], the analysis service 616 may be configured to determine of a third range. However, if the newly requested content sections were in the range [2035-2050], the analysis service 616 may be configured to cause the expansion of range A to be [2035-2060]. The timing information may also be adjusted, such as increasing the TTL to account for the increased range size.

As a non-limiting illustration, consider the case where a user account requests access to the same sporting event recording, except it is 3 am in the morning, resulting in being the only user account watching the sporting event. In this scenario, the analysis service 616 does not send any caching information to the caching service 612. Since there is only one user account accessing a recording from the source stream, it may be inefficient to cache second portions since content sections are likely to only be requested once.

Figure 8:
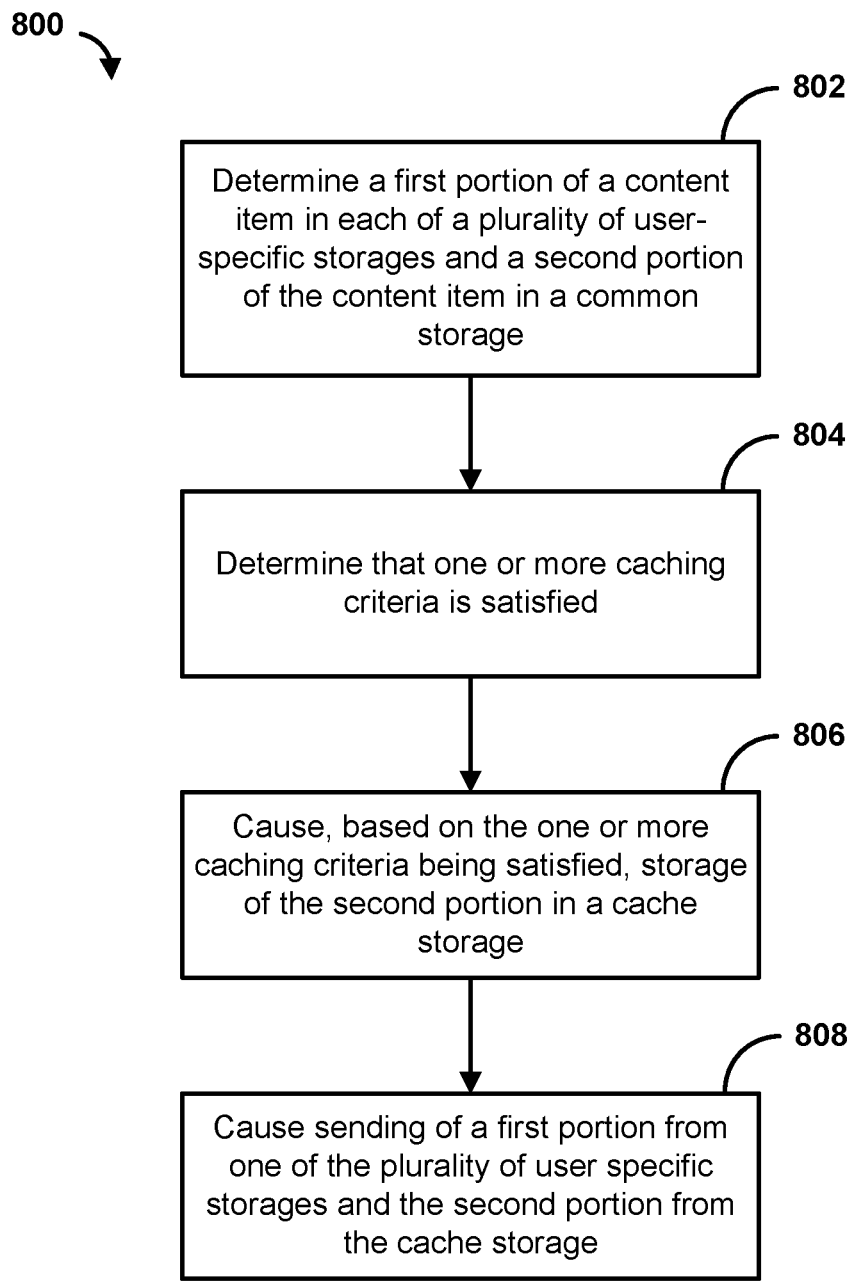
FIG. 8 is a flow diagram showing an example method.

FIG. 8 is a flow diagram showing an example method 800. The method 800 can comprise a computer implemented method. The method 800 can be implemented by one or more devices (e.g., computing devices, servers) and/or services disclosed herein, such as the devices, storage, and/or services of FIG. 1, FIG. 5, and FIG. 6.

At step 802, a first portion of a content item and a second portion of the content item may be determined (e.g., determined for storing, determined from storage, stored, accessed). The first portion may be determined in each of a plurality of user-specific storages associated with corresponding user accounts of a plurality of user accounts. The second portion of the content item may be determined in a common storage associated with the plurality of user accounts.

The first portion may comprise a first portion of a content section (e.g., content segment). The second portion may comprise a second portion of the content section. The first portion and the second portion may be generated (e.g., determined) as part of a network based content recording service. The plurality of user accounts may be accounts associated with the content recording service. The content item may comprise a content stream, content file, and/or the like. The content item may comprise a plurality of sections (e.g., segments, such as a 2 second segment). To store the content item for later access, each section may be subdivided into at least one first portion and at least one second portion, as described further herein. A first portion may comprise a first portion of a sequence of bits and the second portion may comprise a second portion of the sequence of bits. The second portion of the sequence of bits may comprise bits directly after (e.g., the first bit in the second portion may be the next bit in the sequence of bits after the last bit in the first portion) the first portion of the sequence of bits. Additional data (e.g., bits) may be combined with the first portion and/or the second portion. For different user accounts, different copies of the first portion may be stored in corresponding user-specific storage associated with respective user accounts of the plurality of user accounts. For each section, a single copy of the second portion may be stored in the common storage for access by each of the plurality of user accounts. The first portion and the second portion may be subportions of a media portion of the content item (e.g., media portion 204 shown in FIG. 2).

At step 804, it may be determined that one or more caching criteria is satisfied. The determination may be based on a plurality of requests associated with receiving (e.g., or accessing) the stored content item. The plurality of requests may be requests for a section of the content before a section of the content item comprising the first portion and the second portion. The plurality of requests may be requests for the section of the content item comprising the first portion and the second portion. The one or more caching criteria may comprise a threshold number of the plurality of user accounts being associated with requesting the stored content item. The one or more caching criteria may comprise a range indicating a subset of one or more sections of the content item associated with active playback of the content item for at least a portion of the plurality of user accounts. Each of the one or more sections may comprise a corresponding first portion and second portion. The range may be updated over time as one or more of the plurality of user accounts progress in playback of the content item.

At step 806, storage of the second portion in a cache storage different from the common storage may be caused. The storage of the second portion in the cache storage different from the common storage may be caused based on the one or more caching criteria being satisfied. Causing storage of the second portion in the cache storage may comprise causing a copy of the second portion (e.g., or moving the second portion) to be stored in the cache storage until the one or more caching criteria are no longer satisfied. The cache storage may be temporary storage.

The second portion may be caused to be stored in the cache storage based on the second portion being associated with the subset. The second portion may comprise a common portion that matches the range. The common portion may match the range based on the common portion being associated with a content section of source content (e.g., the source content from which the different copies of the stored content item originated). The second portion may be associated with (e.g., in the common storage) a source section identifier. The source section identifier can identify a source content section from which the second portion originated.

At step 808, a first portion from one of the plurality of user-specific storages and the second portion from the cache storage may be caused to be sent (e.g., separately or in combination). A combination of the first portion and the second portion may be caused to be sent. The combination may be determined by appending the second portion to the first portion from the one of the plurality of user-specific storages. The combination may be determined by appending (e.g., or prepending) the second portion to the first portion. The combination of the first portion and the second may be determined using one or more combination rules. The one or more combination rules may be based on the selection rules used to determine the second portion. The first portion and the second portion (e.g., the combination) may be further combined with header data to form a content section, packet, and/or the like.

The first portion and/or the second portion (e.g., the combination) may be sent based on (e.g., in response to) an additional request associated with accessing the stored content item. The additional request may comprise a request from a user account (e.g., associated with the one of the plurality of user-specific storages) for the section of the content item. A computing device may be configured to process the request for the section of the content item by determining the first portion associated with the user account and second portion. The computing device may send a request for the second portion located in the common storage. A storage device associated with the common storage and/or another portion of the computing device may receive the request for the second portion located in the common storage. The request may be processed (e.g., by the storage device, computing device) by determining the second portion located in the cache storage (e.g., instead of determining the second portion located in common storage).

The combination of the one of a first portion from one of the plurality of user-specific storages and the second portion from the cache storage may be sent in response to the request from the user account. The combination may be sent via a network, such as a content access network, to a user device associated with the user account. The section of the content may be output via a display of the user device.

Figure 9:
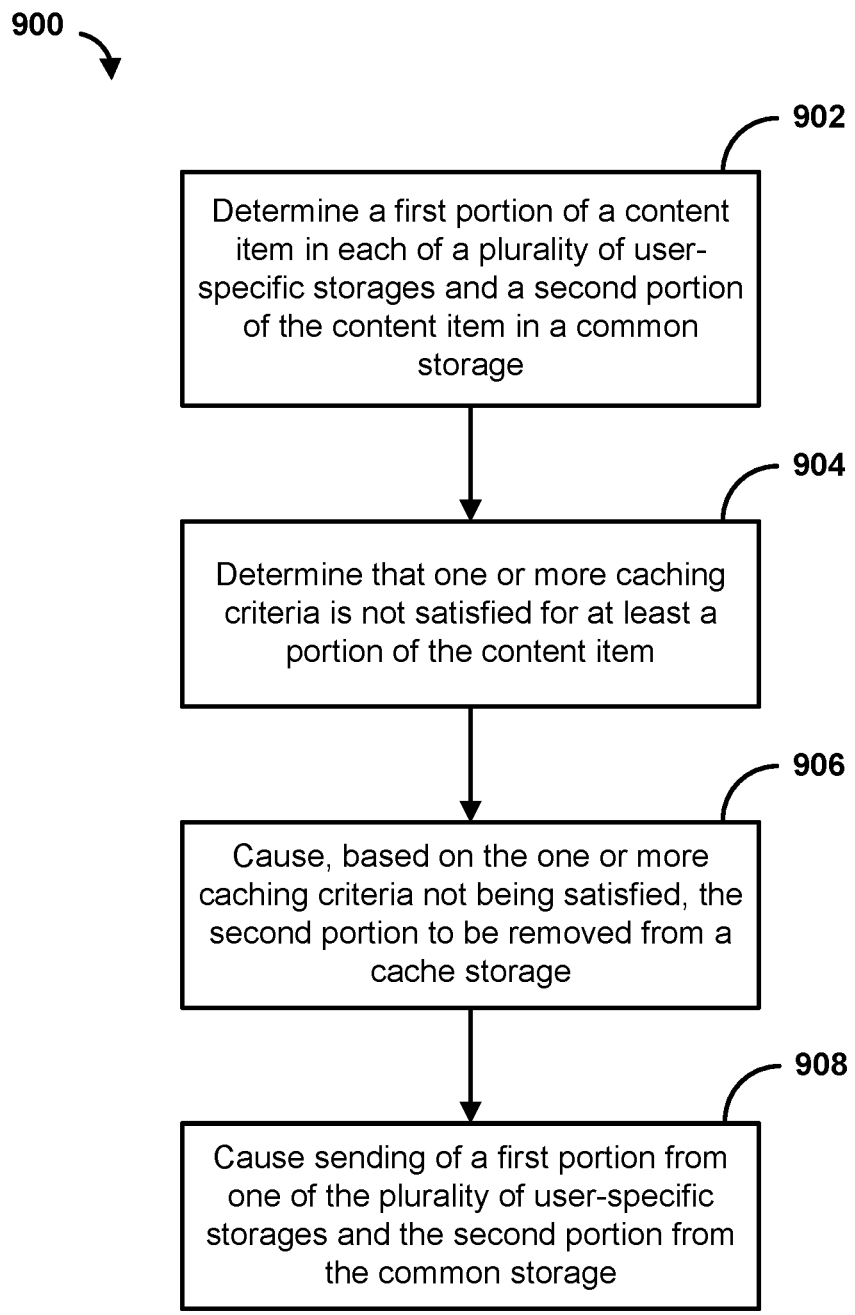
FIG. 9 is a flow diagram showing an example method.

FIG. 9 is a flow diagram showing an example method. The method 900 can comprise a computer implemented method. The method 900 can be implemented by one or more devices (e.g., computing devices, servers) and/or services disclosed herein, such as the devices, storage, and/or services of FIG. 1, FIG. 5, and FIG. 6.

At step 902, a first portion of a content item and a second portion of the content item may be determined (e.g., or determined for storing, stored, accessed). The first portion may be determined in each of a plurality of user-specific storages associated with corresponding user accounts of a plurality of user accounts. The second portion of the content item may be determined (e.g., or determined for storing, stored, accessed) in a common storage associated with the plurality of user accounts.

The first portion may comprise a first portion of a content section (e.g., content segment). The second portion may comprise a second portion of the content section. The first portion and the second portion may be generated (e.g., determined) as part of a network based content recording service. The plurality of user accounts may be accounts associated with the content recording service. The content item may comprise a content stream, content file, and/or the like. The content item may comprise a plurality of sections (e.g., segments, such as a 2 second segment). To store the content item for later access, each section may be subdivided into at least one first portion and at least one second portion, as described further herein. A first portion may comprise a first portion of a sequence of bits and the second portion may comprise a second portion of the sequence of bits. The second portion of the sequence of bits may comprise bits directly after (e.g., the first bit in the second portion may be the next bit in the sequence of bits after the last bit in the first portion) the first portion of the sequence of bits. Additional data (e.g., bits) may be combined with the first portion and/or the second portion. For different user accounts, different copies of the first portion may be stored in corresponding user-specific storage associated with respective user accounts of the plurality of user accounts. For each section, a single copy of the second portion may be stored in the common storage for access by each of the plurality of user accounts. The first portion and the second portion may be subportions of a media portion of the content item (e.g., media portion 204 shown in FIG. 2).

At step 904, it may be determined that one or more caching criteria is not satisfied. It may be determined that the one or more caching criteria is not satisfied for at least a portion of the stored content item. The one or more caching criteria may comprise a threshold number of the plurality of user accounts being associated with requesting the second portion of the stored content item.

The one or more caching criteria may comprise a range indicating a subset of one or more sections of the content item associated with active playback of the content item for at least a portion of the plurality of user accounts. Each of the one or more sections may comprise a corresponding first portion and second portion. The range may be updated over time to include subsequent sections of the content item as one or more of the plurality of user accounts progress in playback of the content item. The range may be associated with timing information indicative of a length of time to use the range for caching decisions.

At step 906, the second portion may be caused to be removed from a cache storage different from the common storage. The cache storage may be temporary storage. The second portion may be caused to be removed from the cache storage different from the common storage based on the one or more caching criteria not being satisfied. Causing the second portion to be removed from the cache storage may comprise deleting a copy of the second portion, moving a copy of the second portion from the cache storage to the common storage, a combination thereof, and/or the like.

At step 908, a first portion from one of the plurality of user-specific storages and the second portion from the common storage may be caused to be sent (e.g., separately or in combination). The second portion be appended to the first portion. A combination of the first portion and the second portion may be determined by appending (e.g., or prepending) the second portion to the first portion. The combination of the first portion and the second portion may be determined using one or more combination rules. The one or more combination rules may be based on the selection rules used to determine the second portion. The first portion and/or the second portion (e.g., or the combination) may be further combined with header data to form a content section, packet, and/or the like.

The first portion and the second portion (e.g., combination) may be sent based on (e.g., in response to) a request associated with accessing the stored content item. The request may comprise a request from a user account (e.g., associated with the one of the plurality of user-specific storages) for the section of the content item. A computing device may be configured to process the request for the section of the content item by determining the first portion associated with the user account and second portion. The computing device may send a request for the second portion located in the common storage. A storage device associated with the common storage and/or another portion of the computing device may receive the request for the second portion located in the common storage. The request may be processed (e.g., by the storage device, computing device) by determining the second portion located in the common storage (e.g., instead of determining the second portion located in common storage). The request may be processed by verifying that the second portion is not located in the cache storage.

The first portion from one of the plurality of user-specific storages and the second portion from the common storage (e.g., or combination) may be sent in response to the request from the user account. The first portion and the second portion (e.g., or the combination) may be sent via a network, such as a content access network, to a user device associated with the user account. The section of the content may be output via a display of the user device.

Figure 10:
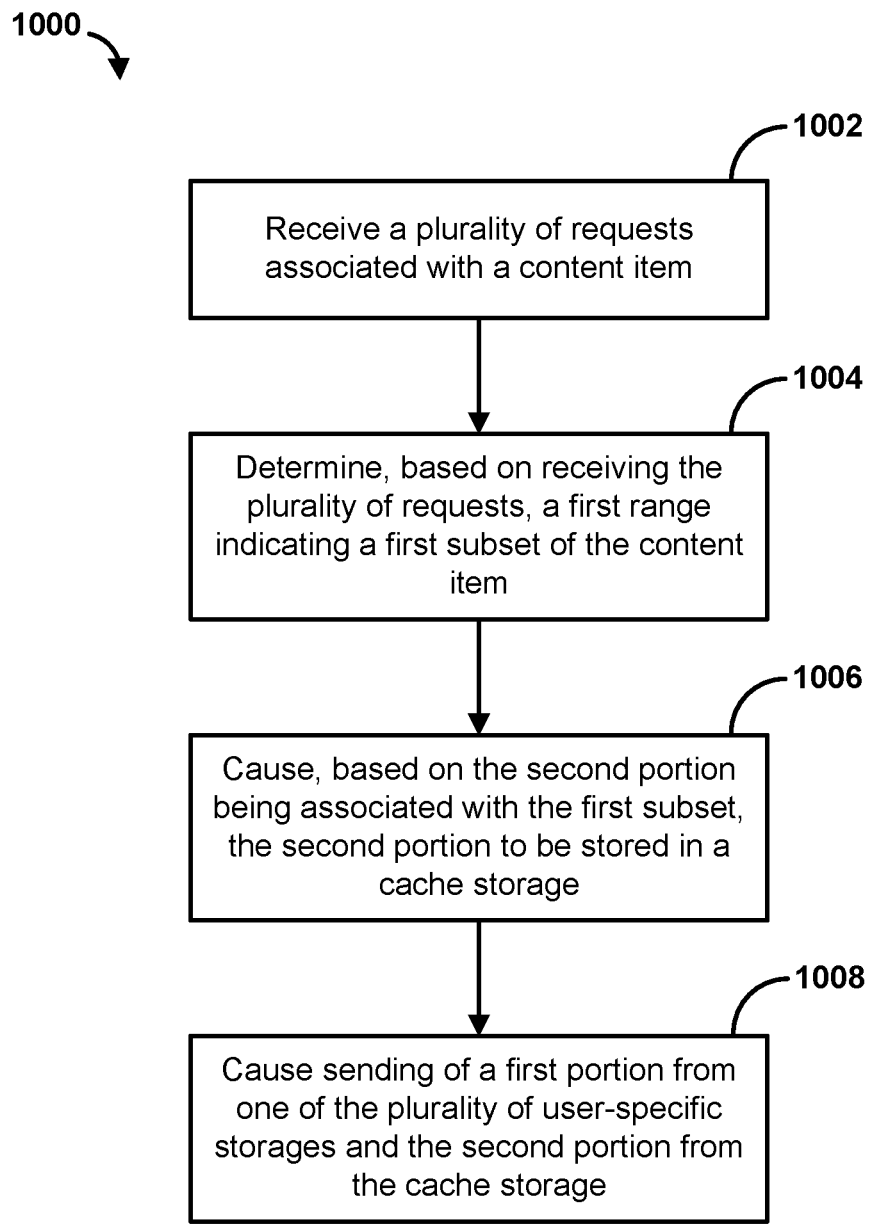
FIG. 10 is a flow diagram showing an example method.

FIG. 10 is a flow diagram showing an example method 1000. The method 1000 can comprise a computer implemented method. The method can be implemented by one or more devices (e.g., computing devices, servers) and/or services disclosed herein, such as the devices, storage, and/or services of FIG. 1, FIG. 5, and FIG. 6.

At step 1002, a plurality of requests associated with a stored content item may be received. A first portion of the content item may be stored in (e.g., or determined for) each of a plurality of user-specific storages associated with corresponding user accounts of a plurality of user accounts. A second portion of the content item may be stored in (e.g., or determined for) common storage.

The first portion may comprise a first portion of a content section (e.g., content segment). The second portion may comprise a second portion of the content section. The first portion and the second portion may be generated (e.g., determined) as part of a network based content recording service. The plurality of user accounts may be accounts associated with the content recording service. The content item may comprise a content stream, content file, and/or the like. The content item may comprise a plurality of sections (e.g., segments, such as a 2 second segment). To store the content item for later access, each section may be subdivided into at least one first portion and at least one second portion, as described further herein. A first portion may comprise a first portion of a sequence of bits and the second portion may comprise a second portion of the sequence of bits. The second portion of the sequence of bits may comprise bits directly after (e.g., the first bit in the second portion may be the next bit in the sequence of bits after the last bit in the first portion) the first portion of the sequence of bits. Additional data (e.g., bits) may be combined with the first portion and/or the second portion. For different user accounts, different copies of the first portion may be stored in corresponding user-specific storage associated with respective user accounts of the plurality of user accounts. For each section, a single copy of the second portion may be stored in the common storage for access by each of the plurality of user accounts. The first portion and the second portion may be subportions of a media portion of the content item (e.g., media portion 204 shown in FIG. 2).

At step 1004, a first range indicating a first subset of the content item may be determined. The first subset may comprise one or more content sections (e.g., or segments, packets). The first range may be determined based on (e.g., in response to) receiving the plurality of requests. The first subset of the content item may be predicted to be requested within a time window based on prior requests. The first range may be associated with timing information indicative of a length of time to use the first range for caching decisions.

The first range may be determined based on one or more caching criteria. The one or more caching criteria may comprise a threshold number of the plurality of user accounts being associated with requesting the stored content item. The one or more caching criteria may comprise a threshold number of the plurality of user accounts being associated with requesting a second subset of content items within a threshold time. The first subset of content items may be sequentially after the second subset. The first subset may be predicted to be requested based on a history of plurality of user accounts requesting the first subset.

At step 1006, the second portion may be caused to be stored in a cache storage different from the common storage. The second portion may be caused to be stored in the cache storage based on the second portion being associated with the first subset. The second portion may comprise a common portion that matches the first range. The common portion may match the first range based on the common portion being associated with a content section of source content (e.g., the source content from which the different copies of the stored content item originated). The second portion may be associated with (e.g., in the common storage) with a source section identifier. The source section identifier can identify a source content section from which the second portion originated.

At step 1008, a first portion from one of the plurality of user-specific storages and the second portion from the cache storage may be caused to be sent (e.g., separately or in combination). The first portion and the second portion (e.g., a combination thereof) may be sent based on an additional request associated with accessing the content item. The additional request may be for a section of the content item associated with the first portion and the second portion. A combination of the first portion and the second portion may be determined by appending (e.g., or prepending) the second portion to the first portion from the one of the plurality of user-specific storages. The combination of the first portion and the second may be determined using one or more combination rules. The one or more combination rules may be based on the selection rules used to determine the second portion. The first portion and/or second portion (e.g., or the combination) may be further combined with header data to form a content section, packet, and/or the like.

The first range may be updated. The first range may be updated based on a change in a number of user accounts requesting the stored content item. One or more additional second portions may be caused to be removed or added to the cache storage. The one or more additional second portions may be caused to be removed or added to the cache storage based on updating the first range.

A second range indicating a second subset of the content item different from the first subset may be determined. The second range may be determined based on receiving the plurality of requests. The second subset may be associated with additional first portions of the content item stored in the plurality of user-specific storages. The second subset may be associated with an additional second portion stored in the common storage. The additional second portion may be caused to be stored in the cache storage.

The first range and the second range may be merged into a combined range. The first range and the second range may be merged into a combined range based on the first range being within a threshold window apart from the second range. The threshold window may comprise a time window (e.g., the first range may be within a threshold number of seconds before or after the second ranger), a numbering window (e.g., the segment numbers for the first range may be with a threshold difference from the segment numbers of the second range), and/or the like.

Figure 11:
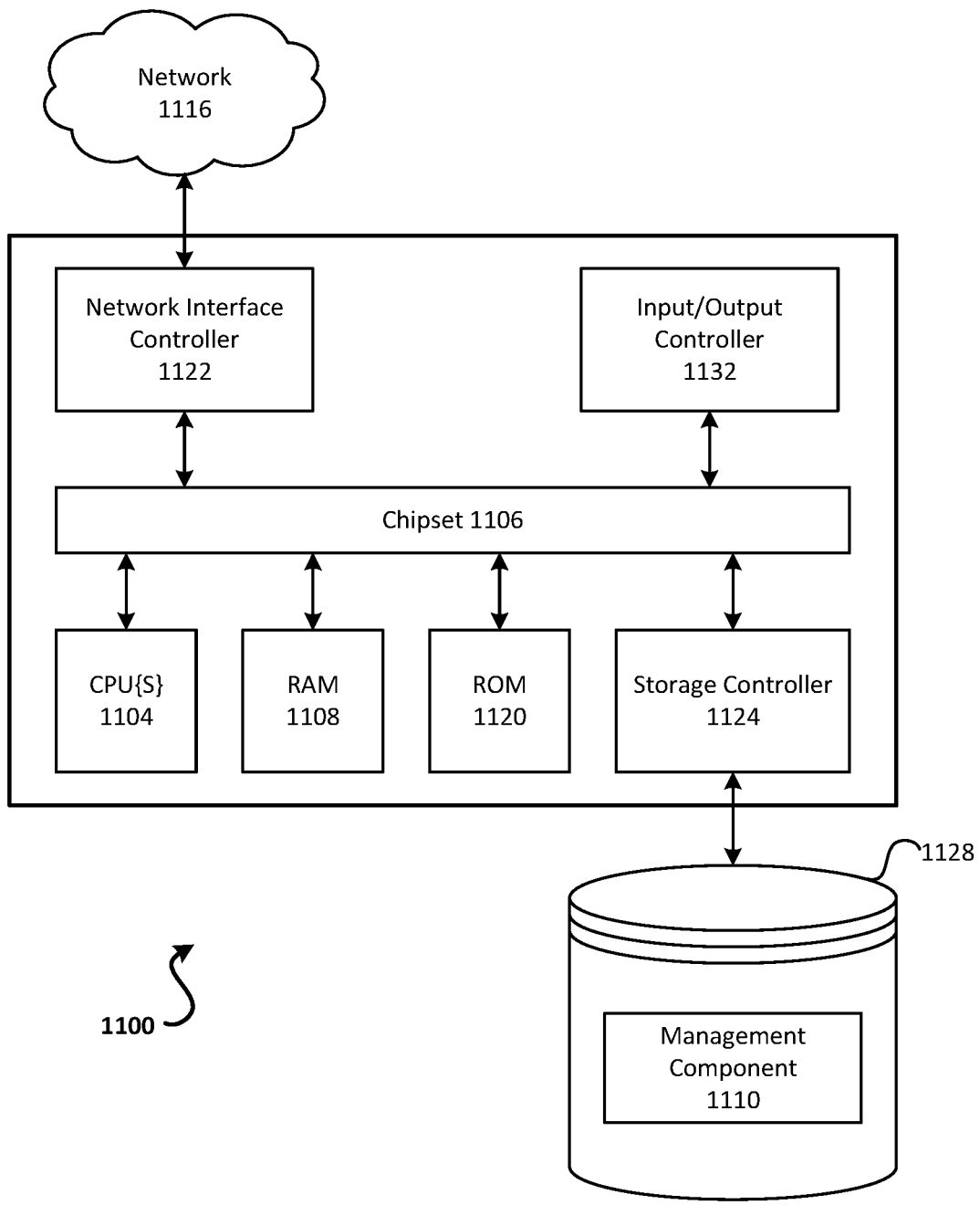
FIG. 11 is a block diagram illustrating an example computing device.

FIG. 11 shows a computing device that may be used in various aspects, such as any of the devices shown in FIG. 1. With regard to the example architecture of FIG. 1, the content device 102, the user device 106, the storage device 104 may each be implemented in an instance of a computing device 1100 of FIG. 11. Any of the user device 602, request service 604, information storage 606, recombination service 608, user-specific storage 610, caching service 612, common storage 614, analysis service 616, or a combination thereof of FIG. 6 may be implemented as one or more instances of the computing device 1100 of FIG. 11. The computer device shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement any of the systems and/or the methods described in relation to FIGS. 1-10.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN) 1116. The chipset 1106 may include functionality for providing network connectivity through a network interface controller (NIC) 1122, such as a gigabit Ethernet adapter. A MC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    causing, based on a first plurality of requests to record a content item, storage of a first portion of the content item in each of a plurality of user-specific storages associated with corresponding user accounts of a plurality of user accounts and storage of a second portion of the content item in a common storage associated with the plurality of user accounts;
    determining, based on a second plurality of requests associated with outputting the stored content item while the content item is being recorded, that one or more caching criteria is satisfied;
    determining, based on the determining that the one or more caching criteria is satisfied, to store the second portion in cache storage different from the common storage;
    causing, based on the determining to store the second portion in the cache storage, storage of the second portion in the cache storage different from the common storage; and
    causing sending of a first portion from one of the plurality of user-specific storages and the second portion from the cache storage.

2. The method of claim 1, wherein at least a portion of the content item is being recorded while the second portion is caused to be stored in the cache storage.

3. The method of claim 1, wherein at least a portion of the stored content item is requested by at least a portion of users of the plurality of user accounts before the content item is finished being recorded.

4. The method of claim 1, further comprising counting a number of the plurality of user accounts currently accessing at least a portion of the content item and updating, based on a change in the number, the caching criteria.

5. The method of claim 1, wherein the one or more caching criteria comprises a range of a plurality of segments of the content item predicted to be accessed by at least a portion of the plurality of user accounts engaged in active playback of the content item.

6. The method of claim 1, wherein the caching criteria is updated over time as one or more of the plurality of user accounts progress in playback of the content item.

7. The method of claim 1, wherein the first portion comprises a first portion of a content section and the second portion comprises a second portion of the content section, and further comprising appending the second portion to the first portion from the one of the plurality of user-specific storages.

8. A method comprising:
    causing, based on a first plurality of requests to record a content item, storage of a first portion of the content item in each of a plurality of user-specific storages associated with corresponding user accounts of a plurality of user accounts and storage of a second portion of the content item in a common storage associated with the plurality of user accounts;
    determining, based on a second plurality of requests associated with outputting the stored content item while the content item is being recorded, that one or more caching criteria is not satisfied for at least a portion of the stored content item;
    determining, based on the determining that the one or more caching criteria is not satisfied, to remove the second portion from cache storage different from the common storage;
    causing, based on the determining to remove the second portion from the cache storage, the second portion to be removed from the cache storage different from the common storage; and
    causing sending of a first portion from one of the plurality of user-specific storages and the second portion from the common storage.

9. The method of claim 8, wherein at least a portion of the content item is being recorded while the second portion is caused to be stored in the cache storage.

10. The method of claim 8, wherein at least a portion of the stored content item is requested by at least a portion of users of the plurality of user accounts before the content item is finished being recorded.

11. The method of claim 8, further comprising counting a number of the plurality of user accounts currently accessing at least a portion of the content item and updating, based on a change in the number, the caching criteria.

12. The method of claim 8, wherein the one or more caching criteria comprises a range of a plurality of segments of the content item predicted to be accessed by at least a portion of the plurality of user accounts engaged in active playback of the content item.

13. The method of claim 12, wherein the range is updated over time to include subsequent segments of the content item as one or more of the plurality of user accounts progress in playback of the content item.

14. The method of claim 12, wherein the range is associated with timing information indicative of a length of time to use the range for caching decisions.

15. A device comprising:
    one or more processors; and
    memory storing instructions that, when executed by the one or more processors, cause the device to:
        cause, based on a first plurality of requests to record a content item, storage of a first portion of the content item in each of a plurality of user-specific storages associated with corresponding user accounts of a plurality of user accounts and storage of a second portion of the content item in a common storage associated with the plurality of user accounts;

determine, based on a second plurality of requests associated with outputting the stored content item while the content item is being recorded, that one or more caching criteria is satisfied;

determine, based on the determining that the one or more caching criteria is satisfied, to store the second portion in cache storage different from the common storage;

cause, based on the determining to store the second portion in the cache storage, storage of the second portion in the cache storage different from the common storage; and cause sending of a first portion from one of the plurality of user-specific storages and the second portion from the cache storage.

16. The device of claim 15, wherein at least a portion of the content item is being recorded while the second portion is caused to be stored in the cache storage.

17. The device of claim 15, wherein at least a portion of the stored content item is requested by at least a portion of users of the plurality of user accounts before the content item is finished being recorded.

18. The device of claim 15, wherein the instructions, when executed by the one or more processors, further cause the device to count a number of the plurality of user accounts currently accessing at least a portion of the content item and update, based on a change in the number, the caching criteria.

19. The device of claim 15, wherein the one or more caching criteria comprises a range of a plurality of segments of the content item predicted to be accessed by at least a portion of the plurality of user accounts engaged in active playback of the content item.

20. The device of claim 15, wherein the caching criteria is updated over time as one or more of the plurality of user accounts progress in playback of the content item.

21. The device of claim 15, wherein the first portion comprises a first portion of a content section and the second portion comprises a second portion of the content section, and further comprising appending the second portion to the first portion from the one of the plurality of user-specific storages.

22. A device comprising:
one or more processors; and
memory storing instructions that, when executed by the one or more processors, cause the device to:

cause, based on a first plurality of requests to record a content item, storage of a first portion of the content item in each of a plurality of user-specific storages associated with corresponding user accounts of a plurality of user accounts and storage of a second portion of the content item in a common storage associated with the plurality of user accounts;

determine, based on a second plurality of requests associated with outputting the stored content item while the content item is being recorded, that one or more caching criteria is not satisfied for at least a portion of the stored content item;

determine, based on the determining that the one or more caching criteria is not satisfied, to remove the second portion from cache storage different from the common storage;

cause, based on the determining to remove the second portion from the cache storage, the second portion to be removed from the cache storage different from the common storage; and cause sending of a first portion from one of the plurality of user-specific storages and the second portion from the common storage.

23. The device of claim 22, wherein at least a portion of the content item is being recorded while the second portion is caused to be stored in the cache storage.

24. The device of claim 22, wherein at least a portion of the stored content item is requested by at least a portion of users of the plurality of user accounts before the content item is finished being recorded.

25. The device of claim 22, wherein the instructions, when executed by the one or more processors, further cause the device to count a number of the plurality of user accounts currently accessing at least a portion of the content item and update, based on a change in the number, the caching criteria.

26. The device of claim 22, wherein the one or more caching criteria comprises a range of a plurality of segments of the content item predicted to be accessed by at least a portion of the plurality of user accounts engaged in active playback of the content item.

27. The device of claim 26, wherein the range is updated over time to include subsequent segments of the content item as one or more of the plurality of user accounts progress in playback of the content item.

28. The device of claim 26, wherein the range is associated with timing information indicative of a length of time to use the range for caching decisions.

* * * * *